United States Patent

Takei et al.

[11] Patent Number: 5,575,565
[45] Date of Patent: *Nov. 19, 1996

[54] ROLLING GUIDE UNIT

[75] Inventors: Seiji Takei; Takehiko Hara, both of Kanagawa, Japan

[73] Assignee: Nippon Thompson Co., Ltd., Tokyo, Japan

[*] Notice: The term of this patent shall not extend beyond the expiration date of Pat. No. 5,411,334.

[21] Appl. No.: 334,354

[22] Filed: Nov. 3, 1994

[30] Foreign Application Priority Data

Nov. 8, 1993 [JP] Japan ................. 5-064850 U

[51] Int. Cl.$^6$ ................................. F16C 29/06
[52] U.S. Cl. ................................. 384/45; 384/44
[58] Field of Search ................. 384/43, 44, 45

[56] References Cited

U.S. PATENT DOCUMENTS

| | | | |
|---|---|---|---|
| 3,866,484 | 2/1975 | Dreshman | 74/422 |
| 4,688,950 | 8/1987 | Yokota | 384/44 |
| 4,701,057 | 10/1987 | Kashiwabara | 384/45 |
| 4,844,624 | 7/1989 | Teramachi | 384/45 |
| 5,326,197 | 7/1994 | Takei | 384/45 X |
| 5,326,335 | 7/1994 | Takei | 384/45 X |
| 5,345,832 | 9/1994 | Takei | 384/45 X |
| 5,357,819 | 10/1994 | Takei | 384/45 X |
| 5,390,557 | 2/1995 | Tsukada | 384/45 X |
| 5,411,334 | 5/1995 | Takei et al. | 384/45 |

FOREIGN PATENT DOCUMENTS

| | | | |
|---|---|---|---|
| 17665 | 10/1956 | Germany | 384/44 |
| 62-101914 | 5/1987 | Japan . | |
| 63-186028 | 8/1988 | Japan . | |
| 4-8647 | 2/1992 | Japan . | |

Primary Examiner—Thomas R. Hannon
Attorney, Agent, or Firm—Sughrue, Mion, Zinn, Macpeak & Seas

[57] ABSTRACT

A rolling guide unit is disclosed of the curved movement type that together with achieving increased load capacity and rigidity, improved vibration damping characteristics, low noise levels, smooth operation and an extended service life, also demonstrates adequate functions particularly with respect to generated centrifugal force.

The above-mentioned effects are obtained by employing a cross roller system in particular.

12 Claims, 24 Drawing Sheets

ROLLING GUIDE UNIT

BACKGROUND OF THE INVENTION

1. Field of the Invention

The present invention relates to a rolling guide unit that guides an object to be moved along a curve path, and which is equipped on, for example, a machine tool or industrial robot.

2. Description of the Prior Art

An example of this type of rolling guide unit of the prior art is shown in FIG. 1. Furthermore, although the rolling guide unit is disclosed in Japanese Patent Laid-Open Publication No. 63-186028, a similar constitution is also disclosed in Japanese Patent Laid-Open Publication No. 62-101914.

As shown in FIG. 1, this rolling guide unit is equipped with track rail 1, in which one track each in the form of track groove 1a is formed on both the right and left sides along the lengthwise direction, a slider in the form of slide unit 2 able to move relative to the track rail 1, and a plurality of rolling elements in the form of balls (not shown) arranged and contained within a rolling element circulating path (not shown) formed in the slide unit 2 that bear the load between track rail 1 and slide unit 2 by circulating while rolling over the track grooves 1a.

As shown in the drawing, track rail 1 has a constant curvature in the lengthwise direction, and slide unit 2 moves along this curvature. Furthermore, as is clear from the drawing, the cross-section of track rail 1 is of a roughly rectangular shape, while the cross-section of slide unit 2 is roughly U-shaped, with the slide unit 2 being juxtaposed about the track rail 1.

Although the above-mentioned curved movement type of rolling guide unit was developed for the purpose of accommodating increasingly complex operation modes in apparatuses such as industrial robots and so forth without being limited to simple linear, reciprocating operation, the curved movement type of rolling guide units have recently been required to have increased load capacity and rigidity to be able to withstand larger loads, be able to obtain a smooth operating state by effectively absorbing vibrations and reducing noise levels, as well as achieve a longer service life. However, the above-mentioned rolling guide unit of the prior art is still unable to obtain adequate results with respect to these points.

In addition, in the case of curved movement types of rolling guide units, centrifugal force acts during travel of slide unit 2 corresponding to its speed and curvature. The centrifugal force increases in proportion with the weight (mass) of the object loaded on slide unit 2. Thus, since a large centrifugal force acts on the rolling guide unit in the case of loading a relatively heavy object, it is necessary that the rolling guide unit be able to adequately withstand that centrifugal force.

SUMMARY OF THE INVENTION

In consideration of the above-mentioned points, the object of the present invention is to provide a rolling guide unit that together with achieving increased load capacity and rigidity, improved vibration damping characteristics, low noise levels, smooth operation and an extended service life, also functions adequately with respect to generated centrifugal force.

The rolling guide unit according to the present invention is equipped with: a track rail in which is formed track grooves having a roughly V-shaped cross-section along the lengthwise direction; a slider, in which is formed a rolling element circulating path containing load bearing track grooves having a roughly V-shaped cross-section corresponding to said track grooves, and which is able to freely perform relative motion with respect to said track rail; and, a plurality of rollers arranged and contained with said rolling element circulating path so that the axes of rotation of adjacent rollers are crossing, and which circulate while rolling along said track grooves; wherein, said rolling guide unit has a prescribed curvature in the direction of said relative motion.

DESCRIPTION OF THE PREFERRED EMBODIMENTS

The following provides an explanation of the embodiments of the present invention with reference to the attached drawings.

Figure 2:
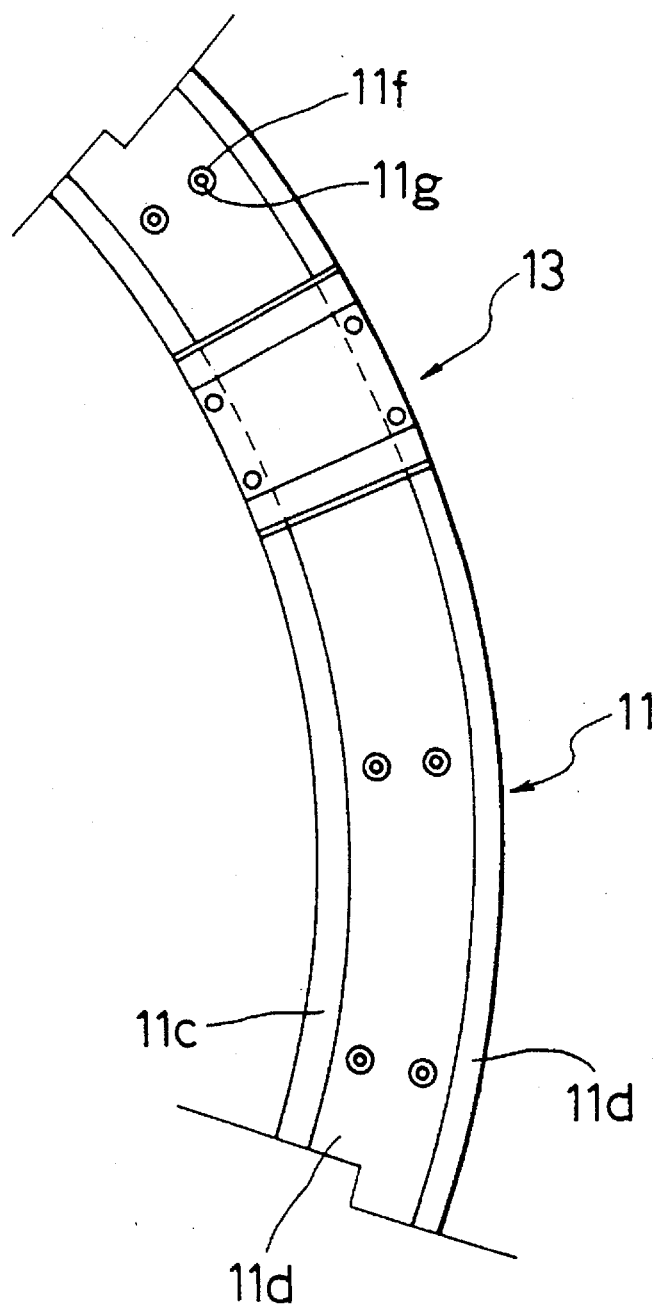
FIG. 2 is an overhead view of the essential portion of a rolling guide unit as a first embodiment of the present invention.
Figure 3:
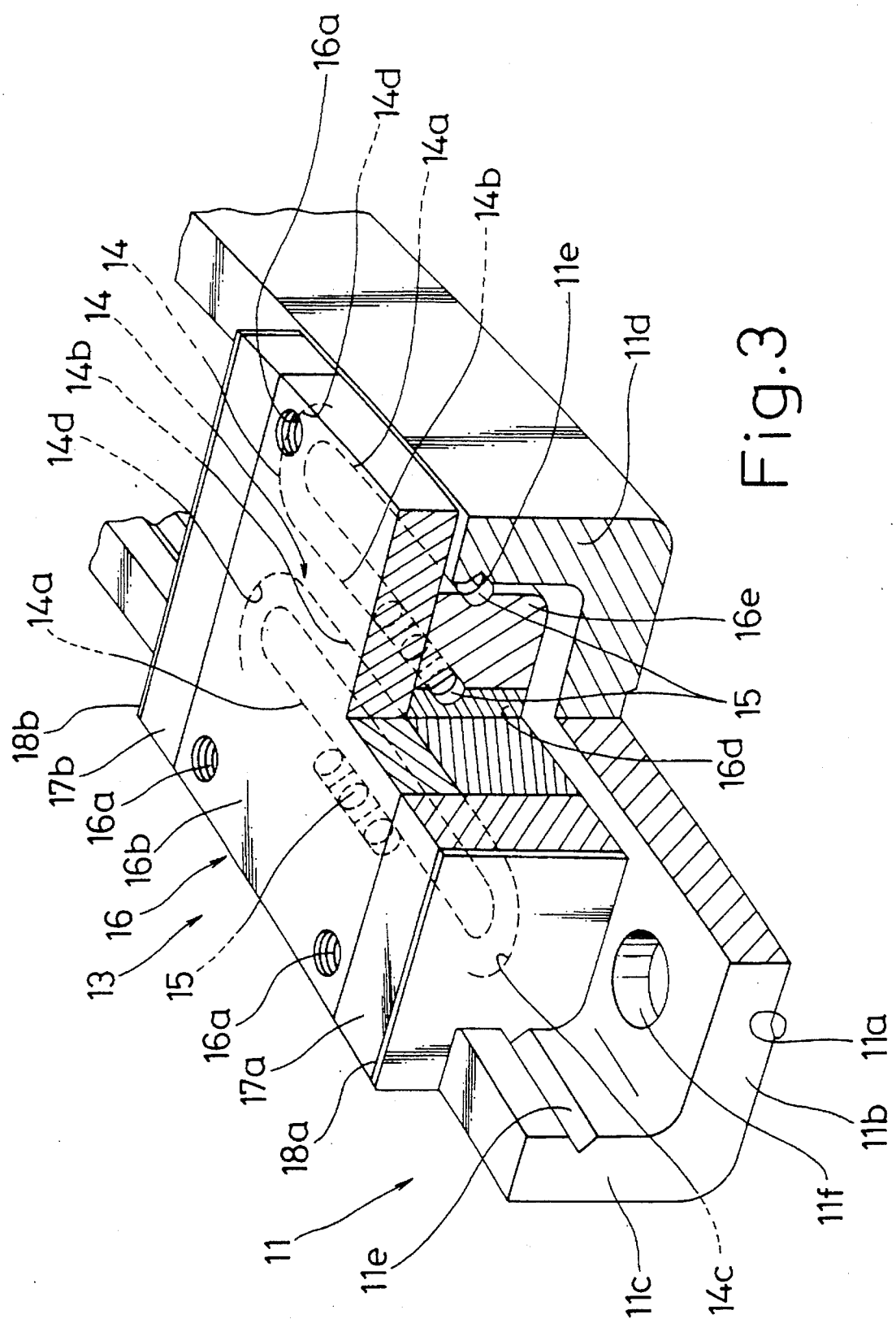
FIG. 3 is a perspective view, including a partial cross-section, of a portion of the rolling guide unit shown in FIG. 2.
Figure 4:
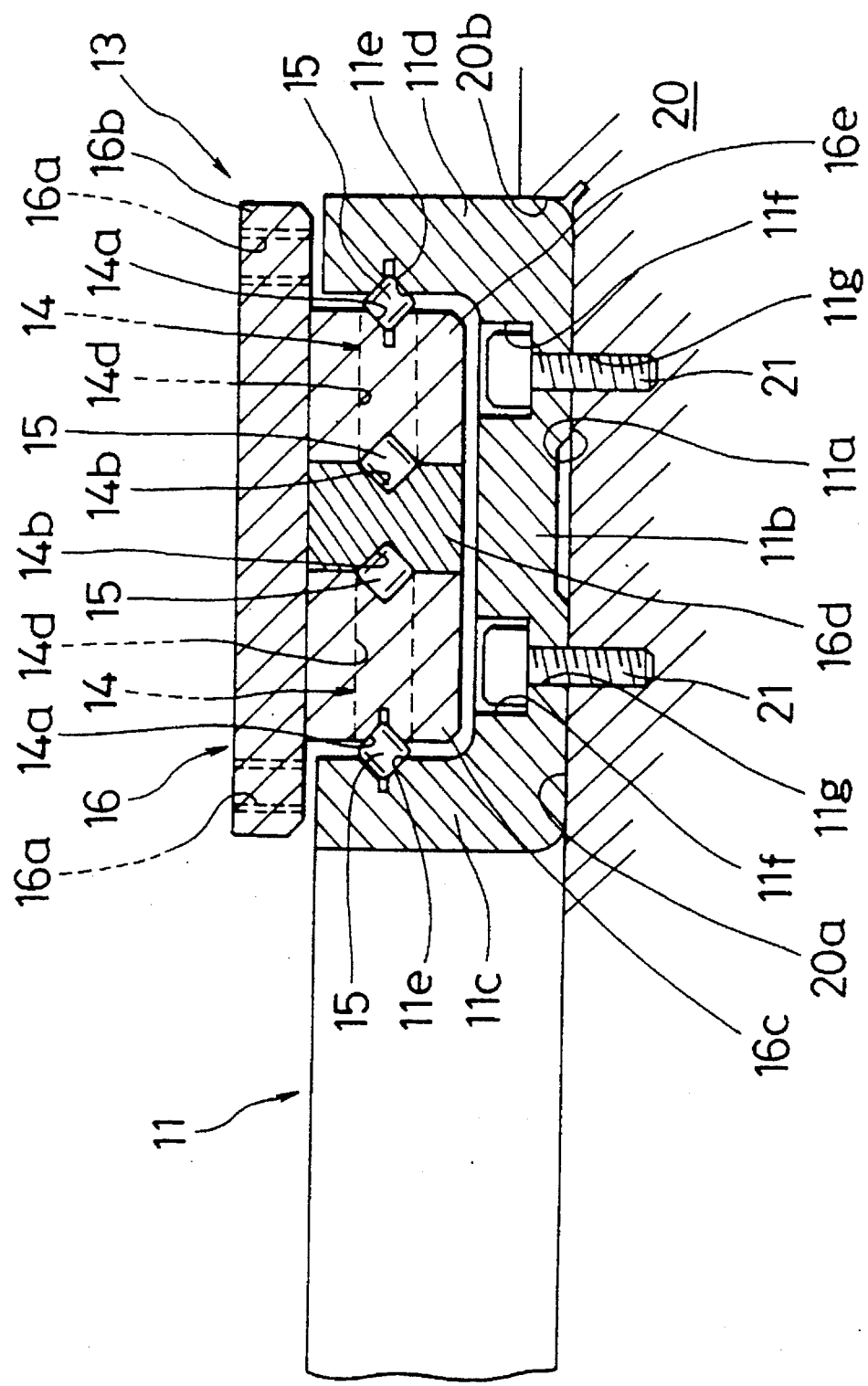
FIG. 4 is a vertical cross-sectional view of the rolling guide unit shown in FIG. 2.

To begin with, the following provides an explanation of a first embodiment of the present invention based on FIGS. 2 through 4.

As shown in FIGS. 2 through 4, the rolling guide unit is equipped with track rail 11, having a constant curvature in the lengthwise direction, and a slider in the form of slide unit 13 able to move relative to track rail 11.

As is particularly clear from FIGS. 3 and 4, track rail 11 has a flat bottom 11b in which mounting surface 11a is formed, and a pair of side walls 11c and 11d that extend perpendicular or roughly perpendicular to bottom 11b from both the left and right sides of said bottom 11b which are integrated into a single unit with the bottom 11b, and has a roughly U-shaped cross-section. One each of tracks in the form of track grooves 11e are formed along the lengthwise direction in the inside surfaces of both of side walls 11c and 11d. These track grooves 11e have a roughly V-shaped cross-section, and open towards the inside at an opening angle of 90°. Furthermore, a metal such as steel and so forth is selected for the material of track rail 11.

On the other hand, slide unit 13 is inserted so that its roughly lower half is sandwiched between the above-mentioned side walls 11c and 11d, and rolling element circulating path 14 is provided in this inserted portion corresponding to both track grooves 11e of the above-mentioned track rail 11. A large number of rolling elements in the form of rollers 15 are arranged and contained within rolling element circulating path 14, the axes of rotation of adjacent rollers cross each other at a right angle, and rollers 15 bear the load between track rail 11 and slide unit 13 by circulating while rolling over the above-mentioned track grooves 11e accompanying movement of slide unit 13.

In FIG. 3, slide unit 13 has casing 16, formed from metal or plastic, a pair of end caps 17a and 17b made of metal or synthetic resin and fastened to both the front and back ends of casing 16 by screws and so forth (not shown), and seals 18a and 18b attached to the outer surfaces of both said end caps 17a and 17b. The above-mentioned rolling element circulating path 14 has load bearing track grooves 14a and return paths 14b formed linearly and mutually in parallel in casing 16 so as to respectively match the curvature of track rail 11, and a pair of roughly semi-circular return paths 14c and 14d formed in both end caps 17a and 17b, that connect said load bearing track grooves 14a and return paths 14b at both their ends. Furthermore, load bearing track grooves 14a correspond with track grooves 11e of track rail 11. In addition, as shown in FIG. 4, the shape of the cross-section of load bearing track grooves 14a is roughly that of the letter V, opened towards the outside at an opening angle of 90°, while the shape of the cross-section of return path 14b is roughly that of a square.

As shown in FIGS. 3 and 4, the above-mentioned casing 16 has holding portion 16b in the shape of a flat plate, and three blocks 16c through 16e mutually coupled and adhered to the lower surface of holding portion 16b. Grooves having a roughly V-shaped cross-section are each formed in advance in the left and right sides of block 16d and on the insides of the other blocks 16c and 16e. The above-mentioned return paths 14b are formed by mutually joining each block 16c, 16d and 16e so that these corresponding V-shaped grooves are mutually opposed. In addition, load bearing track grooves 14a are formed on the outside of the left and right blocks 16c and 16e, although various other constitutions can be used as the method to form return paths 14b, the detailed explanation here will be limited to only indicating the above-mentioned example.

However, as shown in FIG. 4, the rolling guide unit is arranged on flat mounting surface 20a formed on bed 20 of, for example, a machine tool, and track rail 11 is fastened to bed 20 by a plurality of bolts (with hexagon sockets) 21. Furthermore, mounting reference surface 20b is formed perpendicular to mounting surface 20a in bed 20, and the rolling guide unit is positioned by precisely aligning the side surface of track rail 11 with this mounting reference surface 20b. In addition, the above-mentioned bolts 21 are inserted so as to be embedded in countersunk portions 11f and insertion holes 11g formed in bottom 11b of track rail 11, and do not protrude above the upper surface of bottom 11b. Although not shown in the drawings, flanges may be provided on the lower right and left sides of track rail 11, and bolts 21 may be inserted into the above-mentioned countersunk portions 11f and insertion holes 11g formed in these flanges as another arrangement for fastening track rail 11.

On the other hand, a table for holding a workpiece (not shown) is bolted to slide unit 13, and this operates as the moving side. As is also shown in FIG. 3, for example, four threaded holes 16a are formed in the upper surface of casing 16 of slide unit 13, and the table is fastened to slide unit 13 by bolts (not shown) screwed into these threaded holes 16a.

As described above, in the rolling guide unit as claimed in the present invention, since rollers 15 are employed as rolling elements which bear the load at the track surface by line contact, in comparison with rolling guide units of the prior art wherein balls that make point contact are employed, both load capacity and rigidity are increased, thus enabling the rolling guide unit to withstand large loads. Together with achieving improved vibration damping characteristics, low noise levels and smooth operation, a longer service life is attained. In addition, since a cross roller system is employed wherein each roller 15 is arranged so that the corresponding axes of rotation of adjacent rollers 15 cross, the rolling guide unit is able to adequately withstand the relatively large centrifugal force generated due to the rolling guide unit being of the curved type.

Figure 5:
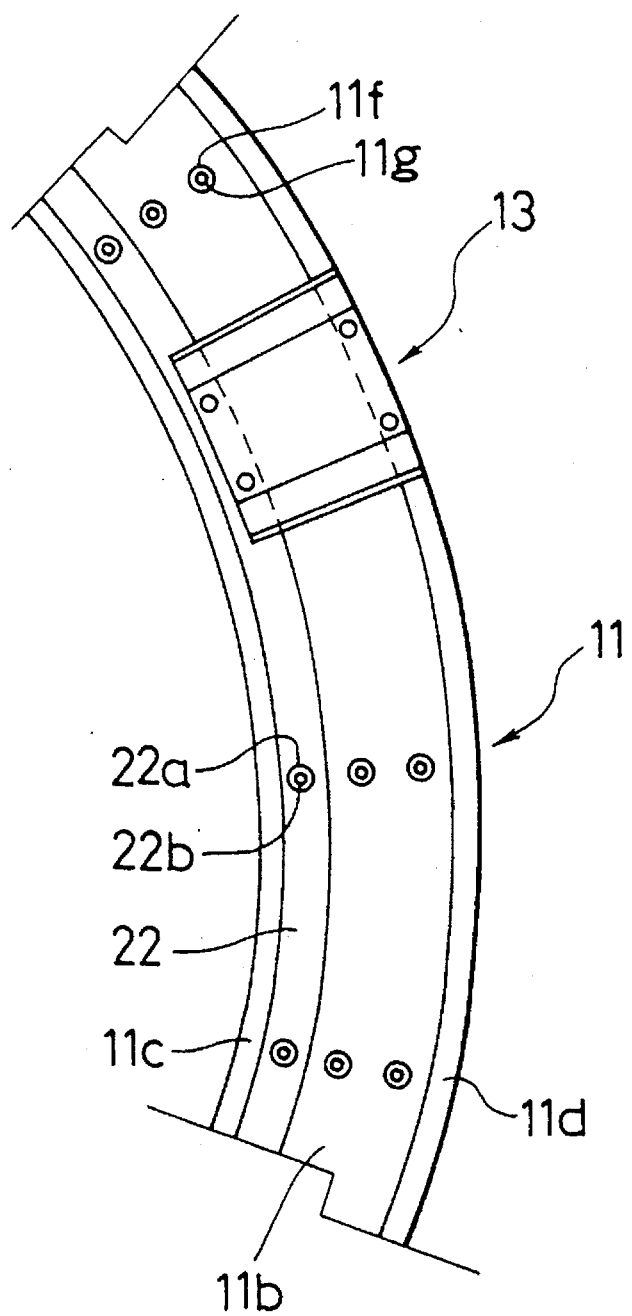
FIG. 5 is an overhead view of the essential portion of a rolling guide unit as a second embodiment of the present invention.
Figure 6:
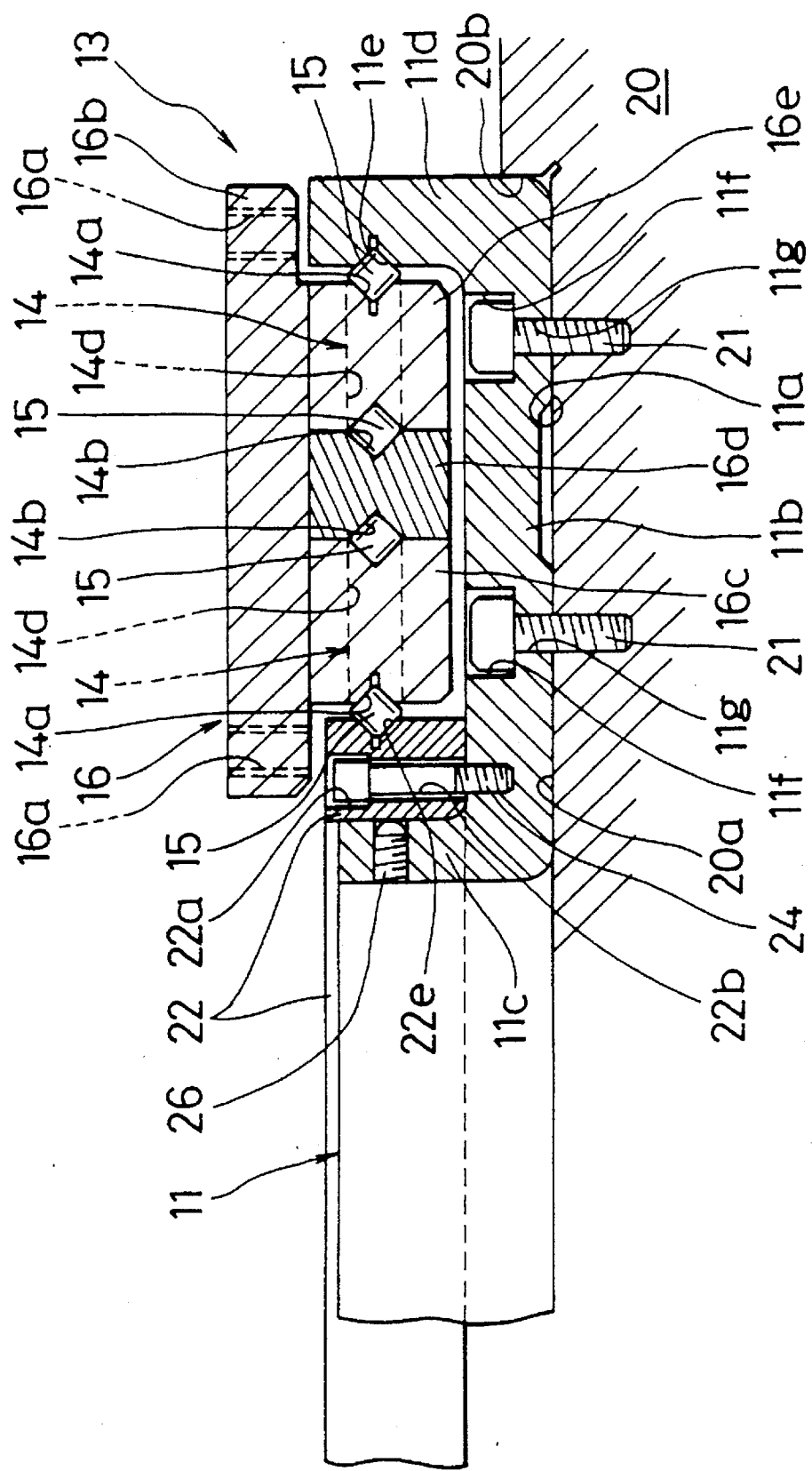
FIG. 6 is a vertical cross-sectional view of the rolling guide unit shown in FIG. 5.

Next, the following provides an explanation of a rolling guide unit as a second embodiment of the present invention based on FIGS. 5 and 6. Furthermore, since the rolling guide unit of the present embodiment has a basic construction similar to the rolling guide unit shown as a first embodiment in FIGS. 2 through 4 with the exception of those portions explained below, an explanation of the overall unit is omitted, and the explanation only focuses on the essential portion. In addition, in the explanation below, the same reference numerals are used for those constituent members that are identical to or correspond with the constituent members of the rolling guide unit of the first embodiment. In addition, this applies similarly in the explanations of the third through fifth embodiments provided later.

As shown in FIG. 6, in the rolling guide unit, track groove 11e is only formed in, for example, the outside side wall 11d among the pair of right and left side walls 11c and 11d possessed by track rail 11, and there is no track groove formed in inside side wall 11c. As is also shown in FIG. 5, rail insert 22, having the same curvature and roughly the same length as track rail 11, is arranged along the inside surface of inside side wall 11c. Slide unit 13 is inserted so as to be sandwiched between rail insert 22 and outside side wall 11d, and is able to move freely with respect to track rail 11 and rail insert 22.

As is clear from FIG. 6, the cross-section of the above-mentioned rail insert 22 is, for example, roughly rectangular in shape, and is fastened to bottom 11b of track rail 11 by a plurality of bolts 24 arranged in a row in its lengthwise direction. Furthermore, these bolts 24 are inserted so as to be embedded in countersunk portions 22a and insertion holes 22b formed in rail insert 22, and do not protrude from the upper surface of rail insert 22. In addition, rail insert 22 itself protrudes slightly above the upper edge of side wall 11c adjacent to it.

As shown in FIG. 6, track groove 22e, having the same shape as track groove 11e provided in outside side wall 11d of track rail 11, is formed along the lengthwise direction in the inside surface of the above-mentioned rail insert 22. This track groove 22e corresponds to load bearing track groove 14a of rolling element circulating path 14 provided in slide unit 13, and each of rollers 15 arranged and contained within rolling element circulating path 14 circulates while rolling over track groove 22e accompanying movement of slide unit 13.

In this embodiment, in the state wherein rail insert 22 is still not installed on track rail 11, the distance between both side walls 11c and 11d is large. Thus, it is easy to insert a rotary grindstone for grinding track rail 11e in the inside surface of side wall 11d, and operation of the grindstone can be performed without restriction, thereby facilitating grinding work.

In addition, grinding of track groove 22e of rail insert 22 can also be performed easily if grinding work is performed before installing said rail insert 22 in track rail 11.

However, as shown in FIG. 6, adjustment screw 26 is screwed into side wall 11c provided with the above-mentioned split rail 22 so as to pass through the inside and outside of said side wall 11c, and its end makes contact with the inside surface of rail insert 22.

On the other hand, as is clear from FIG. 5, since the hole sizes of countersunk portions 22a and insertion holes 22b formed in rail insert 22 for insertion of bolts 24 which fasten said rail insert 22 to track rail 11 are somewhat larger than the diameter of the bolts, rail insert 22 can freely approach or move away from side wall 11c in the state in which bolts 24 are loosened. Namely, by suitably moving rail insert 22 by manipulating the above-mentioned adjustment screw 26 in the state in which bolts 24 are slightly loosened, the pressure can be adjusted between rollers 15, track grooves 11e and 22e sandwiched around them, and load bearing track grooves 14a. However, once adjustment of pressure is completed, bolts 24 are securely tightened to secure rail insert 22.

Furthermore, although rail insert 22 is arranged along inside side wall 22c in the present embodiment, it may also be provided along the inside surface of outside side wall 22d.

Figure 7:
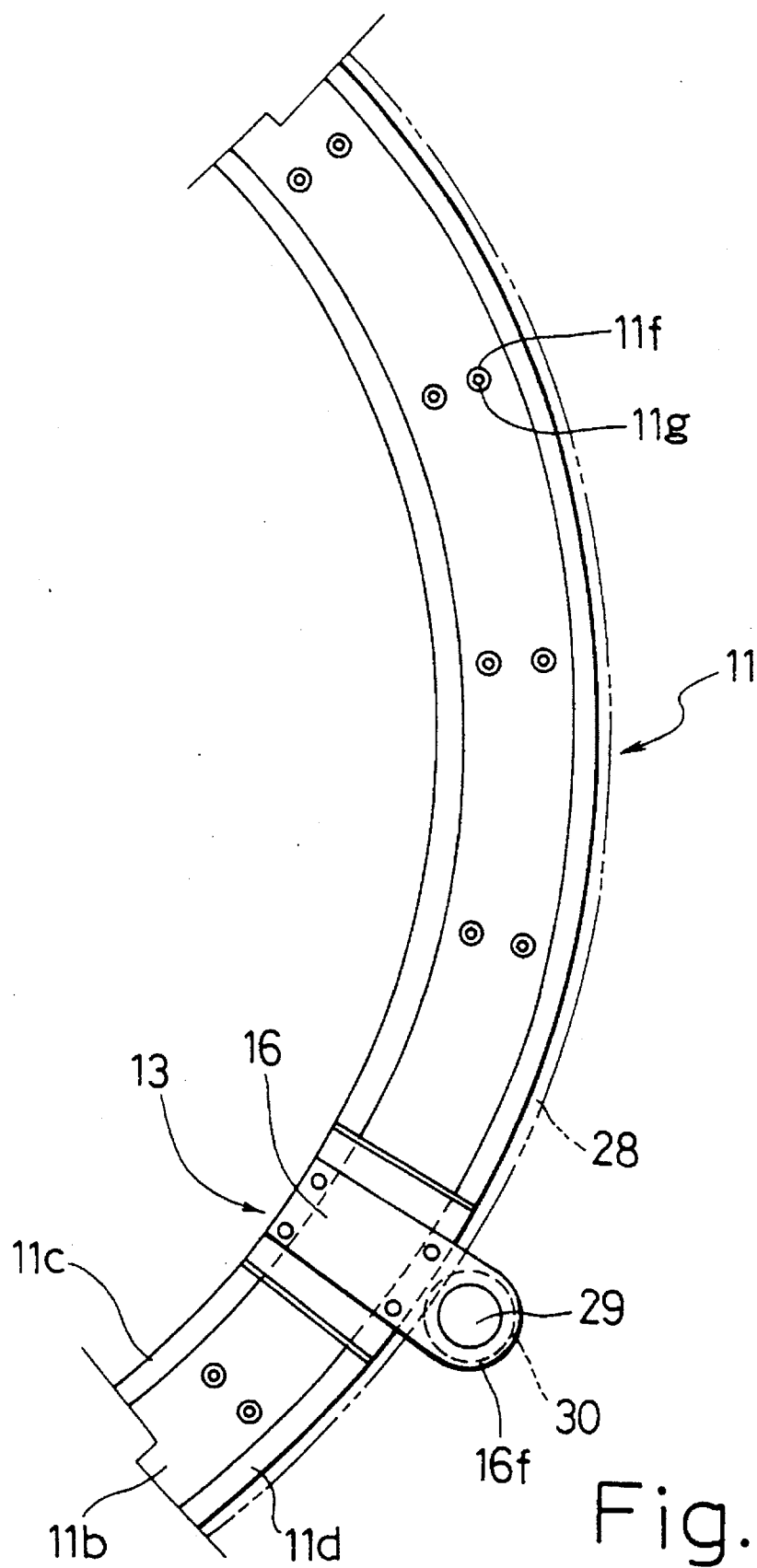
FIG. 7 is an overhead view of the essential portion of a rolling guide unit as a third embodiment of the present invention.
Figure 8:
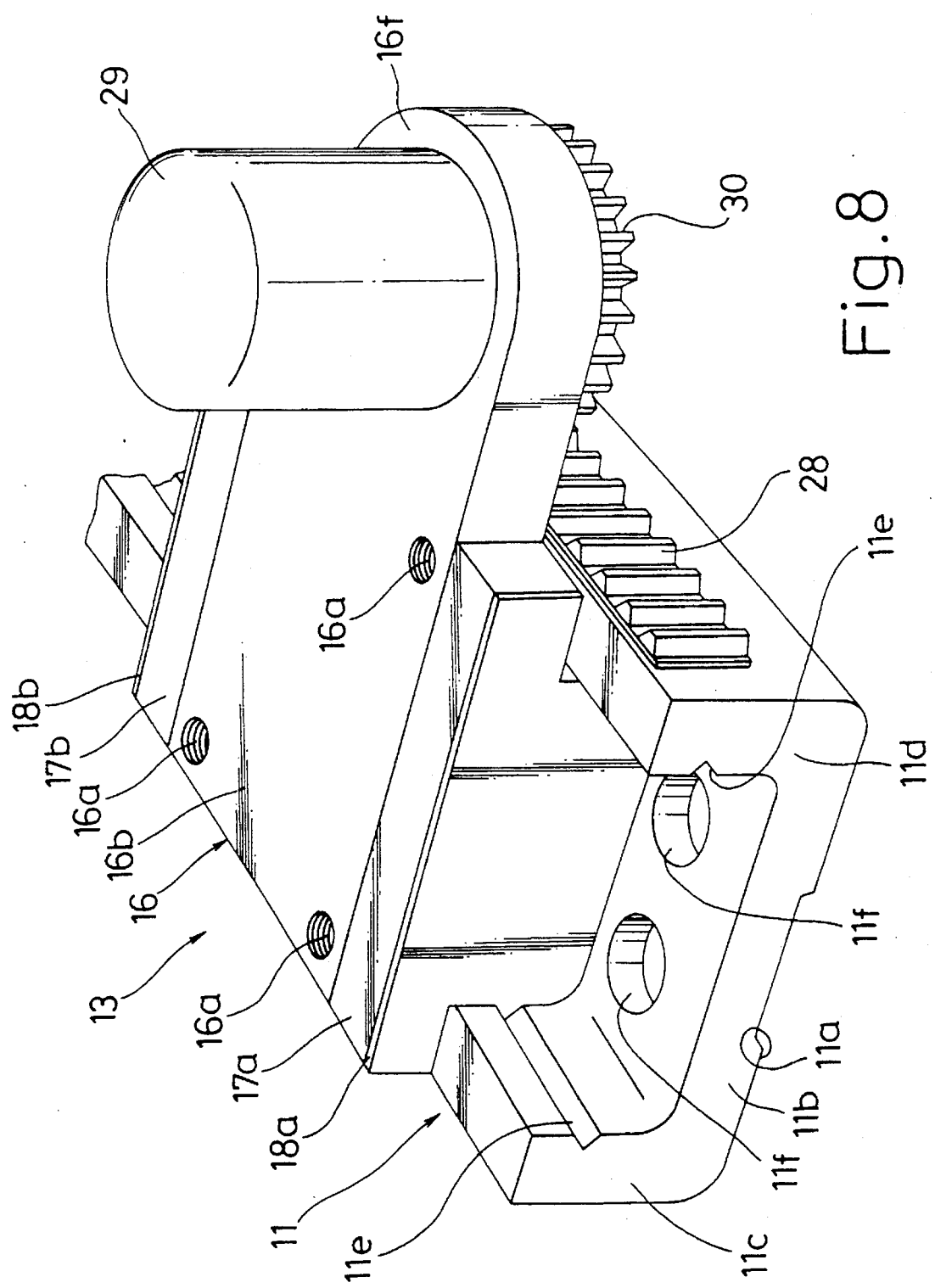
FIG. 8 is a perspective view of a portion of the rolling guide unit shown in FIG. 7.
Figure 9:
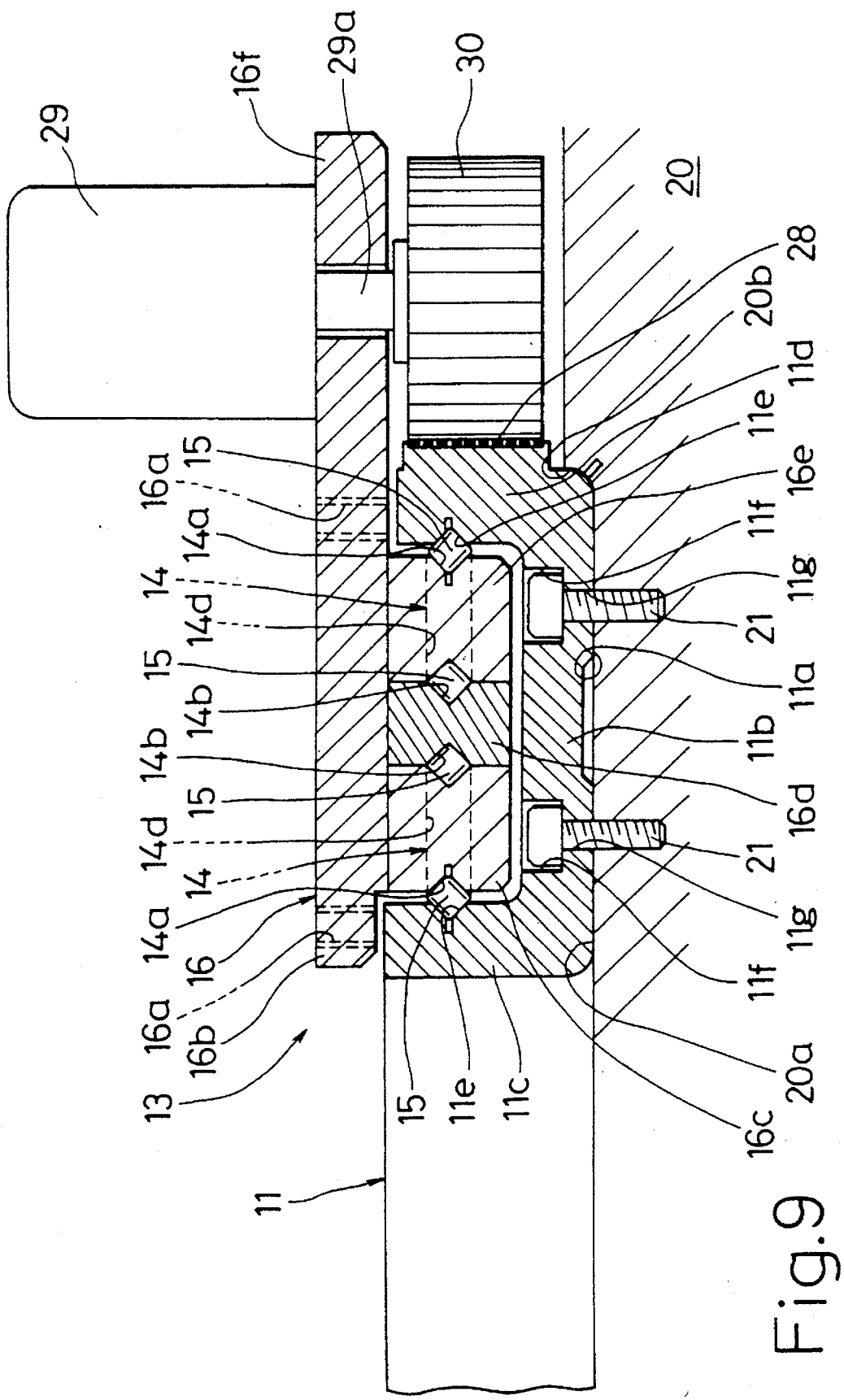
FIG. 9 is a vertical cross-sectional view of the rolling guide unit shown in FIG. 7.

Next, the following provides an explanation of a rolling guide unit as a third embodiment of the present invention based on FIGS. 7 through 9.

As shown in the drawings, in the rolling guide unit, rack 28 is formed integrated into a single structure with outside side wall 11d of track rail 11 along the lengthwise direction of its outside surface.

On the other hand, overhang 16f that protrudes towards the outside is formed integrated into a single unit with casing 16 of slide unit 13, and a driving force generating device in the form of motor 29 is mounted on overhang 16f with its output shaft 29a facing downward. A rolling member in the form of pinion 30 is fit onto output shaft 29a, which meshes with the above-mentioned rack 28.

Namely, said rolling guide unit is of the self-traveling type, wherein pinion 30 rolls while meshing with rack 28 as a result of being rotated and driven by motor 29, resulting in movement of slide unit 13.

Furthermore, although the case is shown in which the driving force generating device is motor 29 in the rolling guide unit, various other driving force generating devices can be applied, including the combination of a motor and speed reducing mechanism.

In addition, although pinion 30 is directly attached to output shaft 29a of motor 29 in the present embodiment, a construction may also be employed in which pinion 30 is attached to casing 16, and a speed reducing mechanism is juxtaposed between pinion 30 and motor 29.

In addition, although rack 28 is formed in outside side wall 11d of track rail 11 in the present embodiment, it may also be provided in inside side wall 11c.

Moreover, although an example of moving a single slide unit 13 on track rail 11 is shown in the present embodiment, a plurality of slide units 13 may be provided, and these may be operated individually.

In the rolling guide unit having the construction described above, although compact size is achieved as a result of making it a self-traveling type, by also employing the basic construction shown in FIGS. 2 through 4, the rolling guide unit can be made even more compact, with the thickness of the overall unit in particular being able to be decreased.

This being the case, in the rolling guide unit, since the cross-section of track rail 11 is roughly in the shape of the letter "U", and track grooves 11e are provided on the inside surfaces of its side walls 11c and 11d, the entire outside surface of side wall 11d can be used for the space to be occupied by rack 28. Thus, even if the entirety of track rail 11 is flat, since rack 28 is provided over roughly the entire outside surface of side wall 11d and a sufficient width can be secured for its teeth, the thickness of the entire unit can be decreased.

Figure 1:
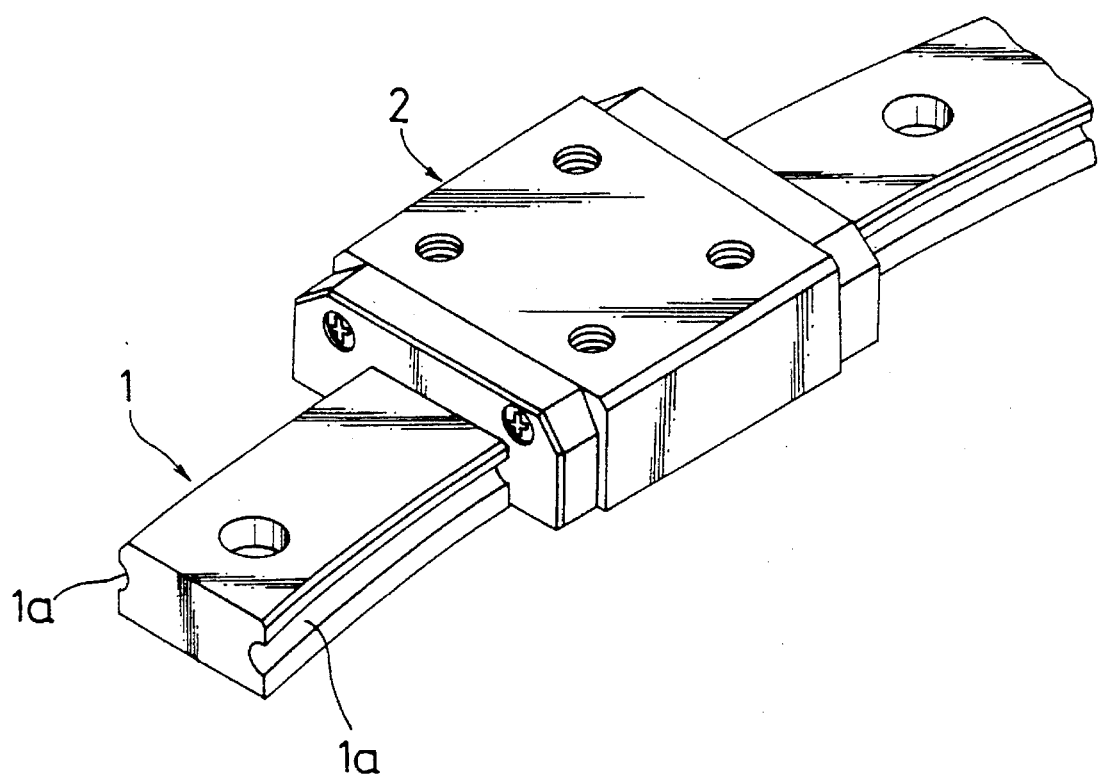
FIG. 1 is a perspective view of the essential portion of a rolling guide unit of the prior art.

Incidentally, in the rolling guide unit having the construction shown in FIG. 1, since track groove 1a is provided on the side of track rail 1 on which a rack is to be provided, in order to secure sufficient width for the rack teeth to allow transmission of the required motive power, the height of track rail 1 must be made correspondingly larger thus resulting in increased size of the overall unit.

Figure 10:
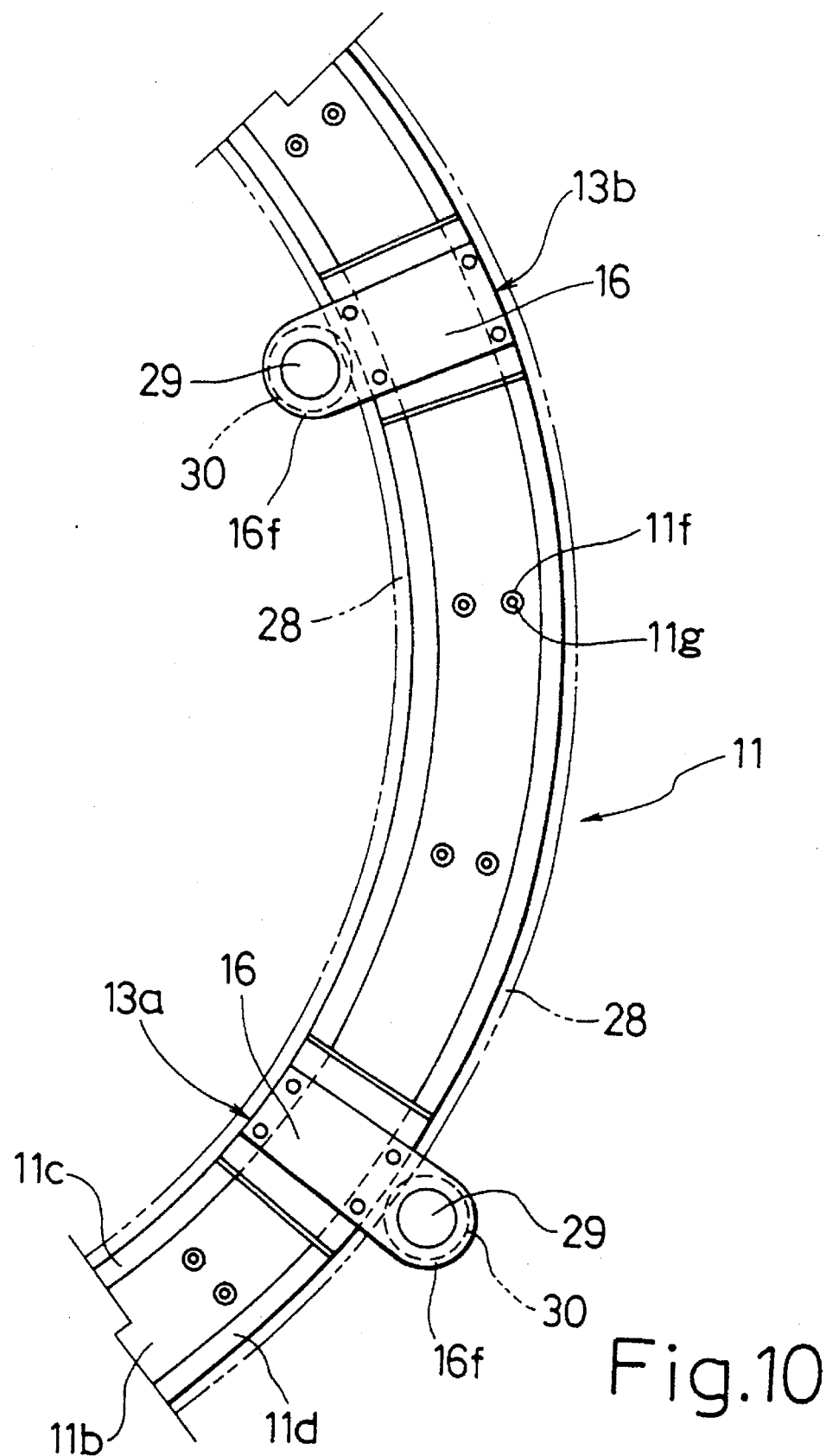
FIG. 10 is an overhead view of a rolling guide unit as a fourth embodiment of the present invention.

FIG. 10 shows a rolling guide unit as a fourth embodiment of the present invention. In contrast to rack 28 being formed on only one of either side wall 11c and 11d on both sides of track rail 11 in the rolling guide unit of the third embodiment described above, in this rolling guide unit, rack 28 is formed in both side walls 11c and 11d.

In addition, a plurality, in this case two, of slide units 13a and 13b are arranged on track rail 11. Pinion 30 equipped on one slide unit 13a meshes with outside rack 28, while pinion 30 equipped on the other slide unit 13b meshes with inside rack 28. In this embodiment, if overhang 16f for holding motor 29 formed on casing 16 equipped on slide units 13a and 13b is able to be detached from the main body of casing 16, thus enabling its orientation when attached to be altered to the left and right, a single type of slide unit can be applied to both inside and outside racks 28.

Figure 11:
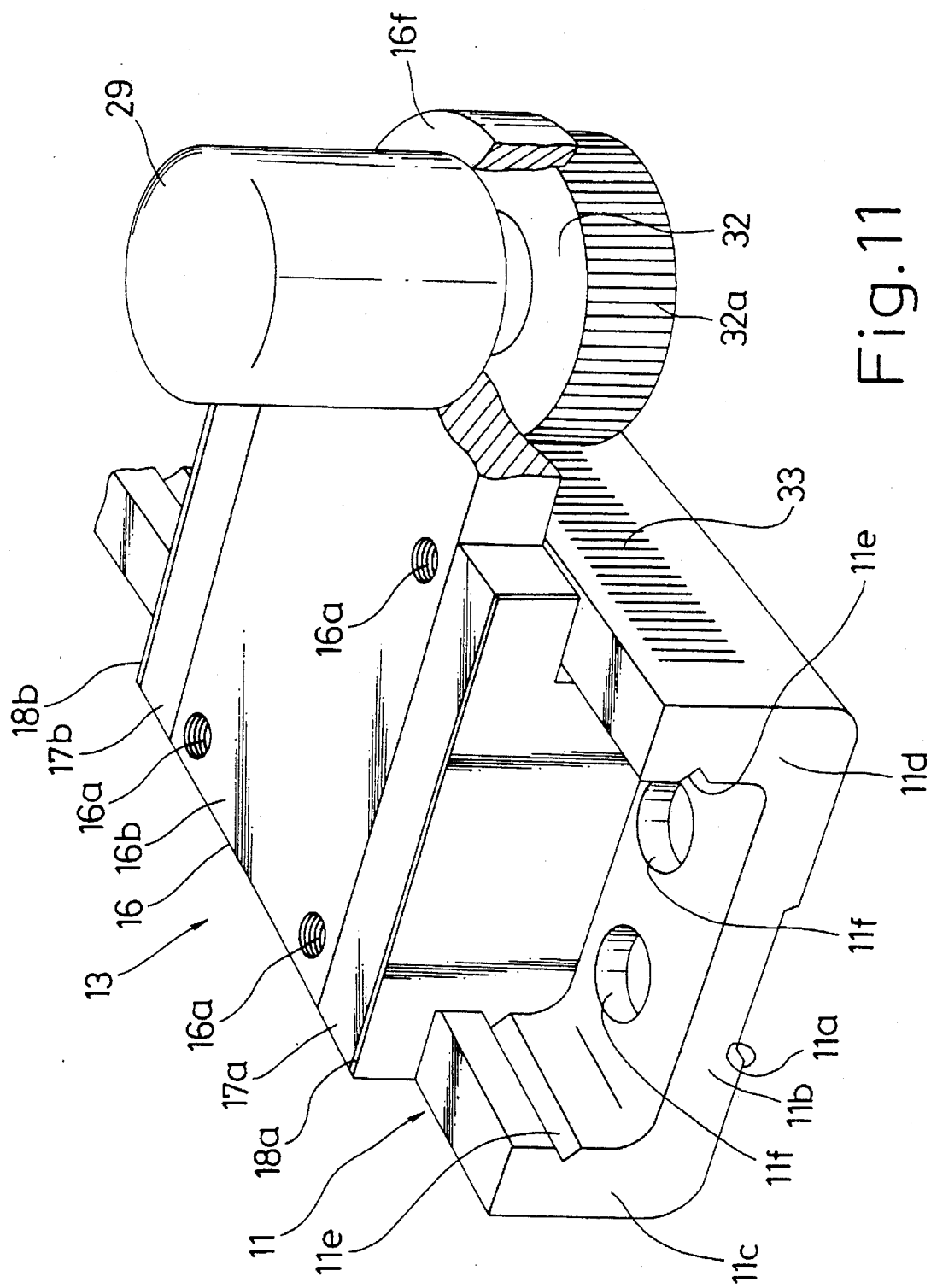
FIG. 11 is a perspective view, including a partial cross-section, of the essential portion of a rolling guide unit as a fifth embodiment of the present invention.

FIG. 11 shows the essential portion of a rolling guide unit as a fifth embodiment of the present invention.

As shown in the drawing, in the rolling guide unit, roller 32 is fit onto the output shaft of motor 29 in the form of a rolling member, and knurlings 32a are formed in the outside surface of roller 32. In addition, knurlings 33 are also formed in the outside surface of side wall 11d of track rail 11 over which roller 32 rolls over roughly the entire length of said side wall 11d. These knurlings 32a and 33 are flat, and lie in parallel with the axis of rotation of roller 32. As a result of providing these knurlings 32a and 33, the frictional force between roller 32 and side wall 11d is increased during rolling of roller 32 along side wall 11d, thereby resulting in increased thrust.

Furthermore, although knurlings are formed in both roller 32 and side wall 11d in the present embodiment, knurlings may also be formed in only one of the above. In addition, although the knurlings shown in the present embodiment are flat, these may be changed to crossed or other types of knurlings, and other surface irregularities may also be formed other than knurlings.

In addition to the above-mentioned constitution which forms knurlings, each of the following arrangements can also be employed.

First, the outside surface of roller 32 and the outside surface of side wall 11d are simply in the form of smooth surfaces and both surfaces make direct contact with each other in the manner of a so-called friction drive system.

Next, an elastic member having a high coefficient of friction such as rubber is adhered to at least one of the mutually joining surfaces of either roller 32 or side wall 11d to increase the coefficient of friction between both.

Finally, a construction can be employed wherein a constant amount of oil is continuously supplied between the above-mentioned roller 32 and side wall 11d. In this construction, an oil film (not shown) is formed between roller 32 and side wall 11d. Consequently, slide unit 13 is propelled by the resistance force, namely traction, that results during shearing of this oil film by the rotation of roller 32.

Figure 12:
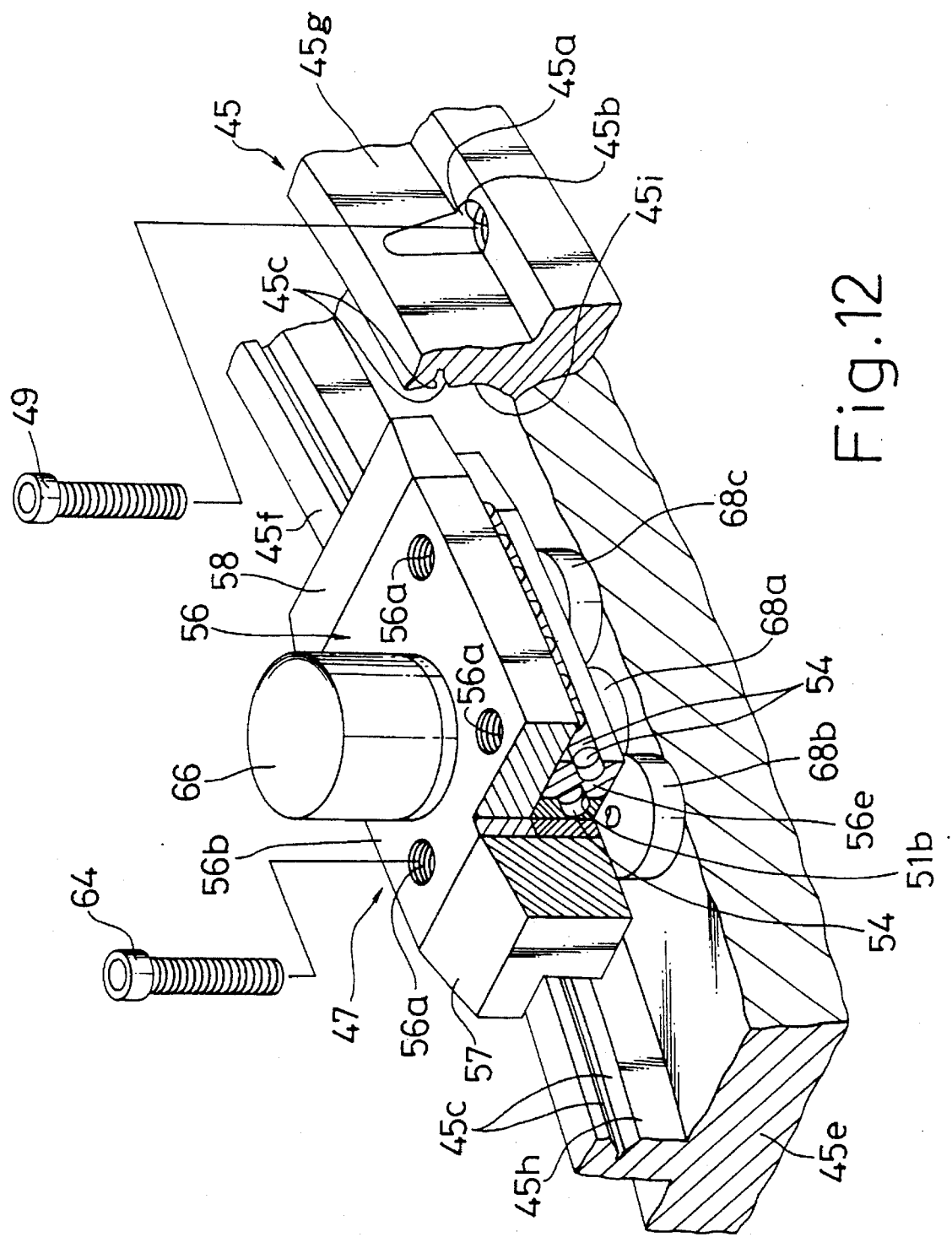
FIG. 12 is a perspective view, including a partial cross-section, of the essential portion of a rolling guide unit as a sixth embodiment of the present invention.
Figure 13:
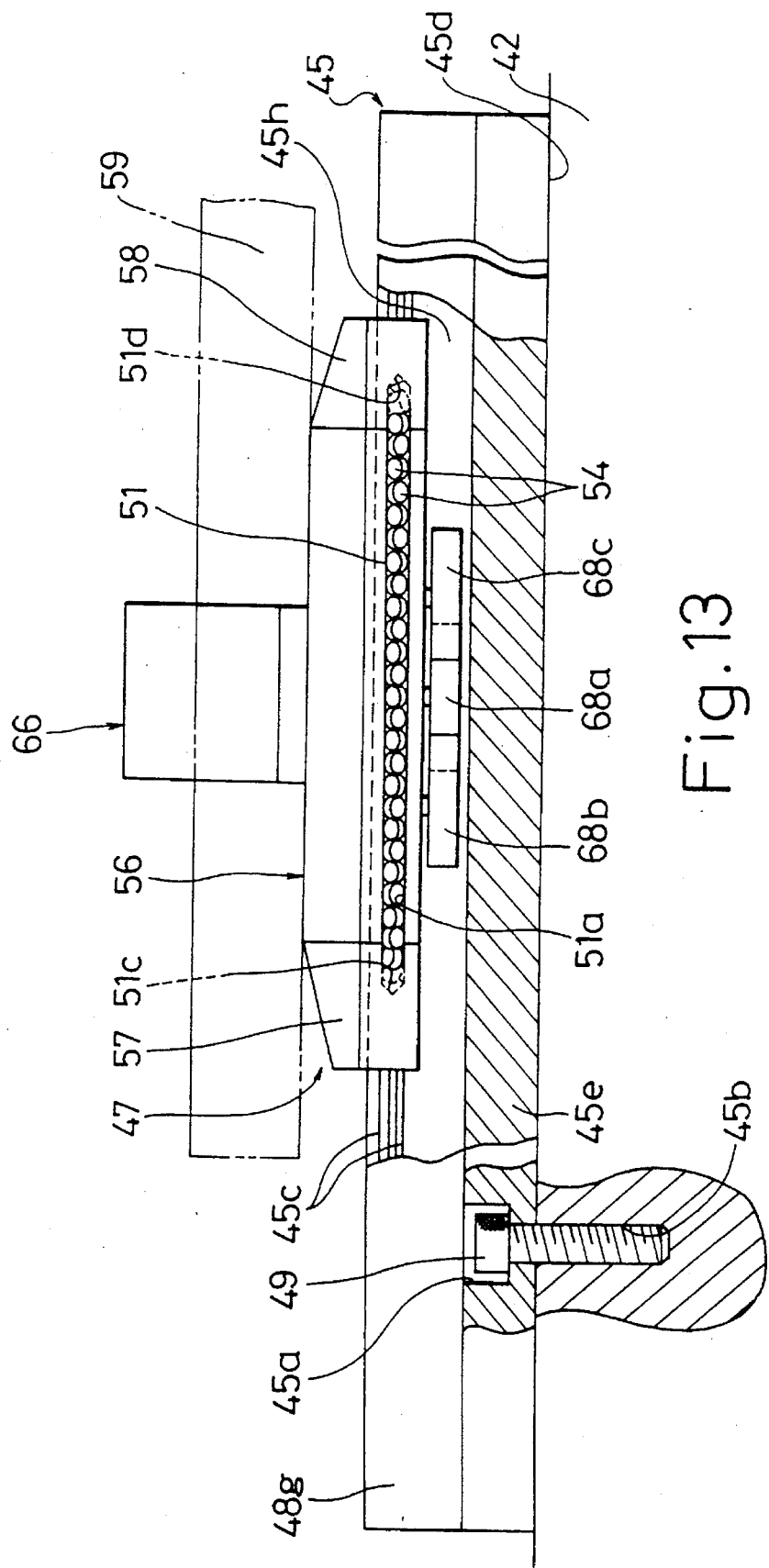
FIG. 13 is a side view, including a partial cross-section, of the essential portion of the rolling guide unit shown in FIG. 12.
Figure 14:
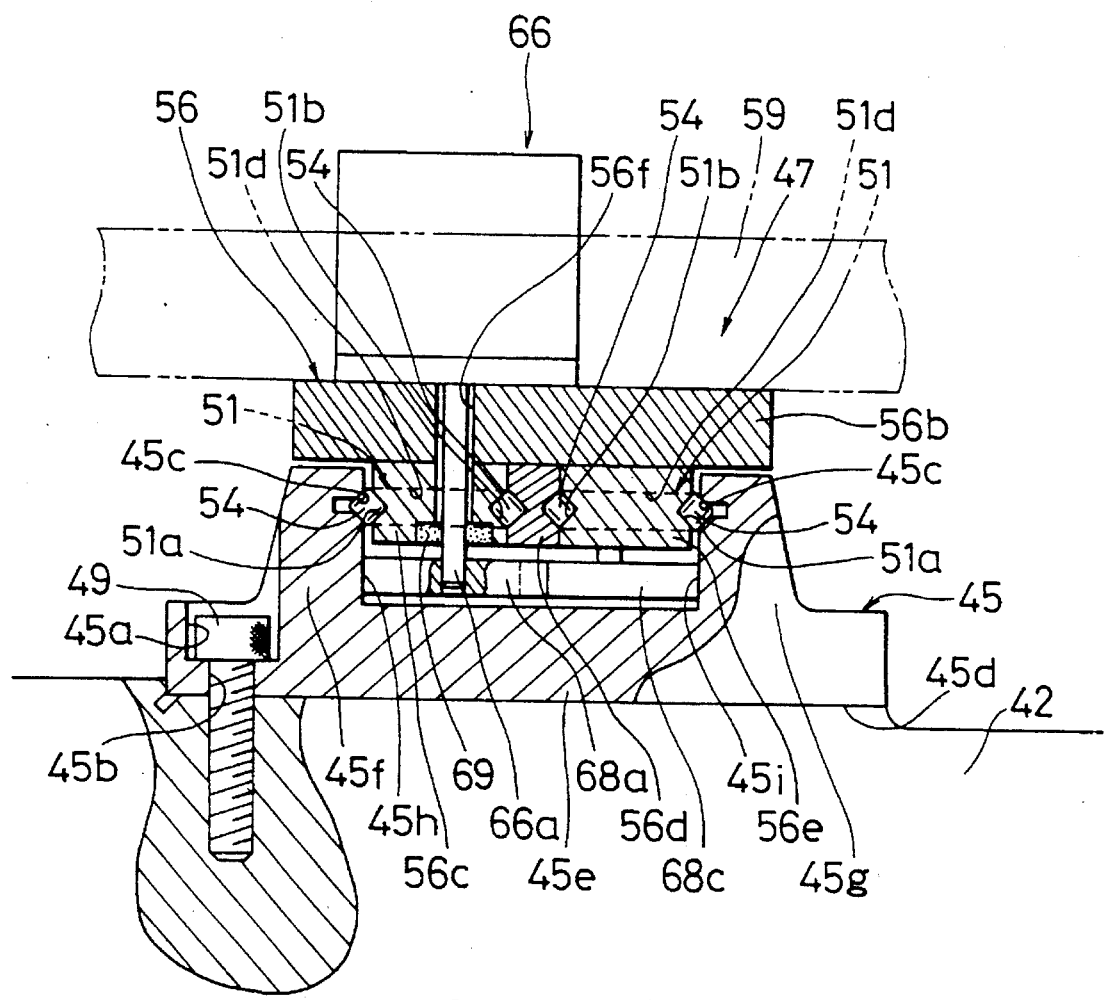
FIG. 14 is a front view, including a partial cross-section, of the rolling guide unit shown in FIGS. 12 and 13.

The following provides an explanation of a rolling guide unit as a sixth embodiment of the present invention based on FIGS. 12 through 14.

As shown in the drawings, the rolling guide unit has track rail 45, fixed on bed 42 equipped on a machine tool and so forth (the entirety of which is not shown), and a slider in the form of slide unit 47 which is guided by track rail 45. Furthermore, track rail 45 is secured to bed 42 by a large number of bolts (with hexagon sockets) 49. More specifically, track rail 45 has flanges on both sides of its bottom, and countersunk portions 45a, having a diameter larger than the heads of bolts 49 for securing track rail 45 to bed 42, and insertion holes 45b, having a diameter slightly larger than the threads of bolts 49, are concentrically formed in the flanges. Bolts 49 are inserted in the countersunk portions and insertion holes so that they are entirely embedded, after which they are screwed into bed 42.

Track rail 45 has a fixed curvature in the lengthwise direction, and is formed so that its cross-section perpendicular to the lengthwise direction is roughly in the shape of the letter "U". It also has a total of two track grooves 45c, one each on the insides of the left and right sides, extending along the lengthwise direction. These track grooves 45c having a roughly V-shaped cross-section, and are opening towards the inside at an opening angle of 90°. However, the number of these track grooves 45c is not always limited to two. In addition, track rail 45 has a flat mounting surface 45d for securing it to bed 42 on its bottom. More specifically, track rail 45 is equipped with flat bottom 45e in which mounting surface 45d is formed, and side walls 45f and 45g extending roughly perpendicular to bottom 45e from both the left and right sides of bottom 45e. The above-mentioned track grooves 45c are formed in the insides of these side walls 45f and 45g. The lower half of slide unit 47 is inserted between walls 45f and 45g.

Slide unit 47 is arranged on this track rail 45, and as shown in FIGS. 13 and 14, contains two rolling element circulating paths 51 corresponding to each of the above-mentioned track grooves 45c. A large number of rolling elements in the form of rollers 54 are arranged and contained within these rolling element circulating paths 51 so that the axes of rotation of adjacent rollers cross at a right angle. Each roller 54 bears the load between track rail 45 and slide unit 47 by circulating while rolling along track grooves 45c accompanying movement of slide unit 47.

As shown in the drawings, slide unit 47 has casing 56, and a pair of end caps 57 and 58 fastened to both the front and back ends of casing 56. The above-mentioned rolling element circulating path 51 is composed of load bearing track grooves 51a and return paths 51b formed mutually in parallel in casing 56 so as to respectively match the curvature of track rail 45, and a pair of roughly semi-circular return paths 51c and 51d formed in both end caps 57 and 58, that connect said load bearing track grooves and return paths at both their ends. Furthermore, load bearing track grooves 51a correspond with track grooves 45c of track rail 45.

As is clear from FIG. 14, the shape of the cross-section of the above-mentioned load bearing track 51a is roughly that of the letter "V", opened towards the outside at an opening angle of 90°. On the other hand, the shape of the cross-section of return path 51b is roughly that of a square.

As shown in FIG. 14, the above-mentioned casing 56 has holding portion 56b in the shape of a flat plate, and three blocks 56c through 56e mutually coupled and adhered to the lower surface of holding portion 56b. Grooves having a roughly V-shaped cross-section are each formed in advance in the left and right sides of block 56d and on the insides of the other blocks 56c and 56e. The above-mentioned return paths 51b are formed by mutually joining each block 56c, 56d and 56e so that these corresponding V-shaped grooves are mutually opposed. In addition, the above-mentioned load bearing track grooves 51a are each formed on the outside of left and right blocks 56c and 56e.

Furthermore, as shown in FIG. 12, a plurality of threaded holes 56a formed in the upper surface, namely the holding surface, of casing 56 of slide unit 47, and table 59 (shown in FIGS. 13 and 14) is fastened to casing 56 by bolts (with hexagon sockets) 64 screwed into these threaded holes 56a.

As described above, in said rolling guide unit, since rollers 54 are employed as rolling elements which bear the load by line contact, in comparison with rolling guide units of the prior art wherein balls that make point contact are employed, both load capacity and rigidity are increased, thus enabling the rolling guide unit to withstand large loads. Together with achieving improved vibration damping characteristics, low noise levels and smooth operation, a longer service life is attained. In addition, since a cross roller system is employed wherein each roller 54 is arranged so that the corresponding axes of rotation of adjacent rollers 54 cross, the rolling guide unit is able to adequately withstand the relatively large centrifugal force generated due to said rolling guide unit being of the curved type.

However, as shown in the drawings, a driving force generating device in the form of motor 66 is mounted roughly in the center of the upper surface of casing 56 of slide unit 47. As is clear from FIG. 14, this motor 66 is mounted so that is output shaft 66a is perpendicular to mounting surface 45d of track rail 45, and in this case facing downward. Thus, since the moment applied to slide unit 47 based on the weight of motor 66 can be minimized by arranging relatively heavy motor 66 on the upper surface of slide unit 47, it is preferable in terms of ensuring high-precision operation of slide unit 47. Furthermore, since motor 66 is provided on the upper surface of slide unit 47, namely the holding surface which holds table 59, as described above, motor 66 is inserted into a through hole (not shown) formed in said table 59 so as not to interfere with table 59.

As shown in FIG. 14, output shaft 66a of motor 66 protrudes from the lower side of casing 56 through through hole 56f formed in casing 56 of slide unit 47. A rolling member in the form of cylindrical drive roller 68a is fit onto this protruding portion. In addition, output shaft 66a is supported by casing 56 by means of bearing 69, in the form of a ball bearing or oil-less bearing and so forth, in the vicinity of its lower end.

In addition, two other drive rollers 68b and 68c are provided on the lower surface of casing 56 at locations that sandwich the above-mentioned drive roller 68a as a result of being separated from each other in the direction of movement of casing 56. These drive rollers engage with the above-mentioned drive roller 68a so as to rotate in synchronization.

On the other hand, track surfaces 45h and 45i are formed in track rail 45 to enable the above-mentioned drive rollers 68a through 68c to engage and roll in parallel with track groove 45c equipped on said track rail 45. More specifically, the inside surfaces of left and right side walls 45f and 45g of track rail 45 serve as these track surfaces 45h and 45i. The rolling surface of drive roller 68a engages with one track surface 45h, while the rolling surfaces of the other two drive rollers 68b and 68c engage with the other track surface 45i.

A prescribed amount of oil is continuously supplied to the above-mentioned track surfaces 45h and 45i. Accordingly, an oil film (not shown) is formed between drive roller 68a and said track surface 45h, between drive rollers 68b and 68c and track surface 45i, as well as between the three drive rollers. Consequently, slide unit 47 is propelled by the resistance force, namely traction, that results during shearing of this oil film by the rotation of roller 66.

In the rolling guide unit of the above-mentioned construction, when motor 66 is operated in the state in which a workpiece and so forth (not shown) is loaded and secured on table 59, drive rollers 68a through 68c roll over each track surface 45h and 45i. Accordingly, table 59 moves back and forth together with slide unit 47 which is holding it, and accompanying this, the required work such as grinding work is performed on the workpiece and so forth.

The following provides an explanation of a rolling guide unit as a seventh embodiment of the present invention based on FIGS. 15 through 18.

As shown in the drawings, the rolling guide unit has track rail 85, fixed on bed 82 equipped on a machine tool and so forth (the entirety of which is not shown), and a slider in the form of slide unit 87 which is guided by said track rail 85. Furthermore, track rail 85 is secured to bed 82 by a large number of bolts (with hexagon sockets) 89. More specifically, as is particularly clear from FIGS. 16 and 17, countersunk portions 85a, having a diameter larger than the heads of bolts 89 for securing said track rail 85 to bed 82, and insertion holes 85b, having a diameter slightly larger than the threads of bolts 89, are concentrically formed in track rail 85, and bolts 89 are screwed into bed 82 inserted in said countersunk portions and insertion holes so that they are entirely embedded.

Figure 16:
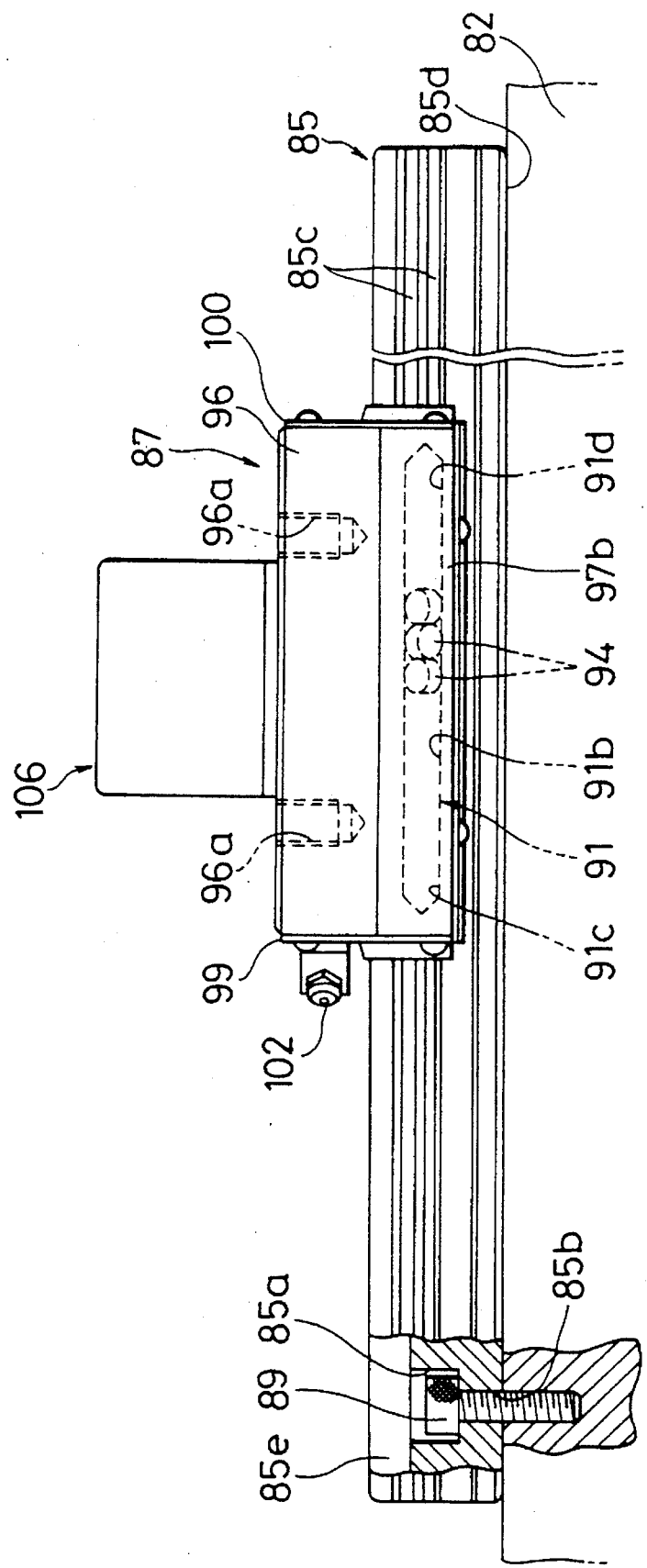
FIG. 16 is a side view, including a partial cross-section, of the essential portion of the rolling guide unit shown in FIG. 15.
Figure 17:
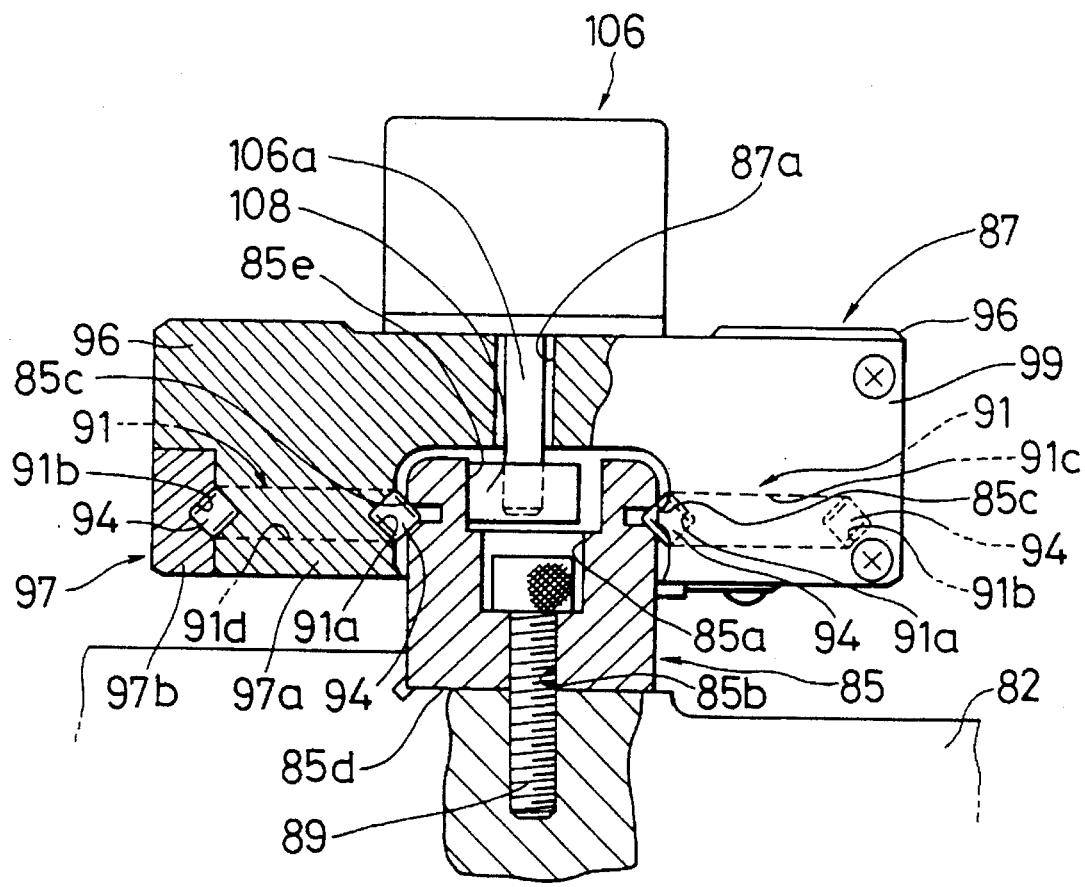
FIG. 17 is a front view, including a partial cross-section, of the essential portion of the rolling guide unit shown in FIGS. 15 and 16.
Figure 18:
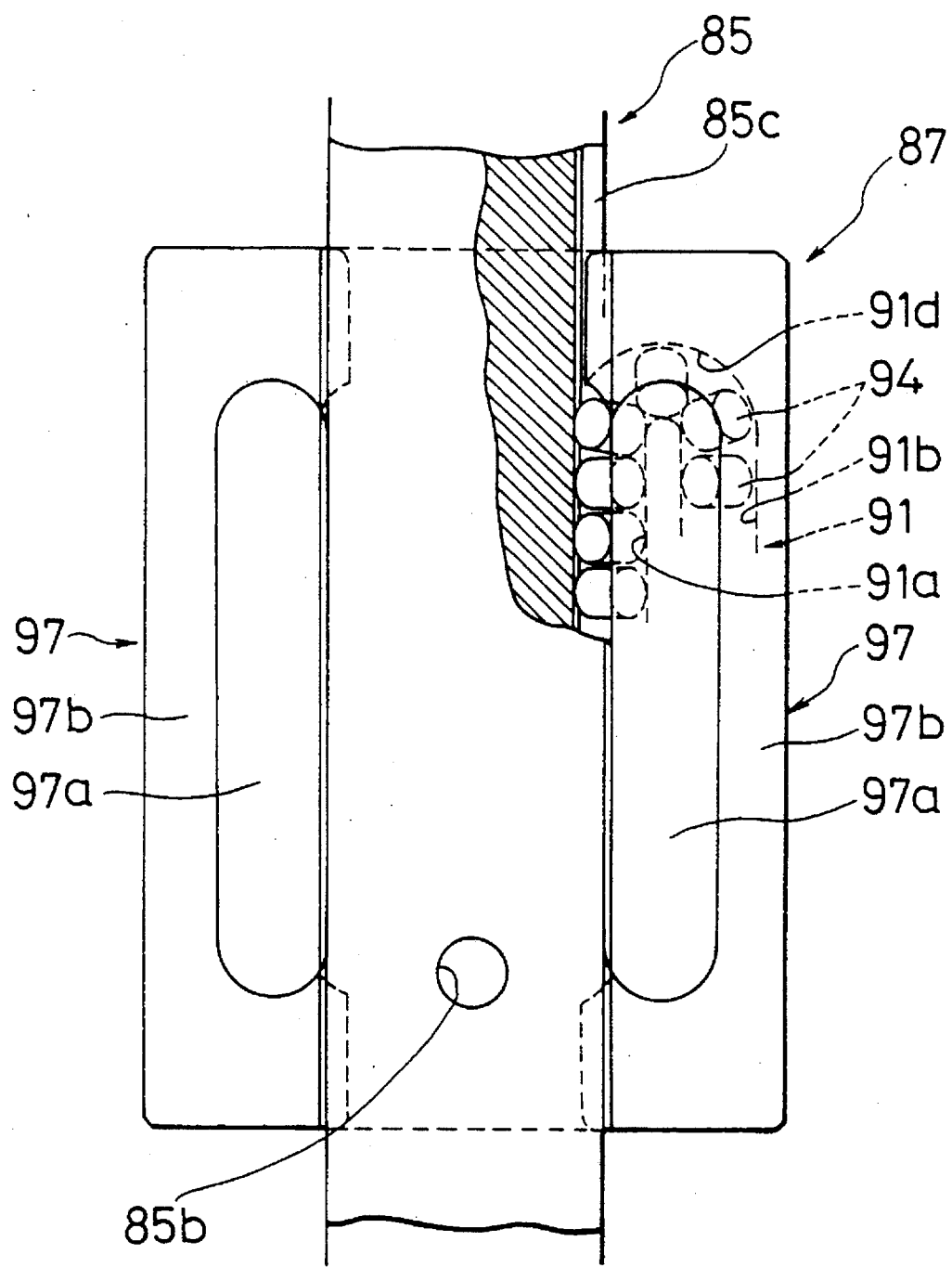
FIG. 18 is a bottom view, including a partial cross-section, of the essential portion of the rolling guide unit shown in FIGS. 2 through 17.

Track rail 85 has a fixed curvature in the lengthwise direction, and is formed so that its cross-section perpendicular to the lengthwise direction is roughly in the shape of a rectangular plate. It also has a total of two track grooves 85c, one each on the left and right sides, formed along the lengthwise direction. These track grooves 85c have a roughly V-shaped cross-section, and open towards the outside at an opening angle of 90°. In addition, track rail 85 has a flat mounting surface 85d for securing it to bed 82 on its bottom. Slide unit 87 straddles track rail 85, and as shown in FIGS. 16 and 17, has two rolling element circulating paths 91 corresponding to each of the above-mentioned track grooves 85c inside. A large number of rolling elements in the form of rollers 94 are arranged and contained within these rolling element circulating paths 91 so that the axes of rotation of adjacent rollers cross. Each roller 94 circulates while rolling along track groove 85c accompanying movement of slide unit 87.

Figure 15:
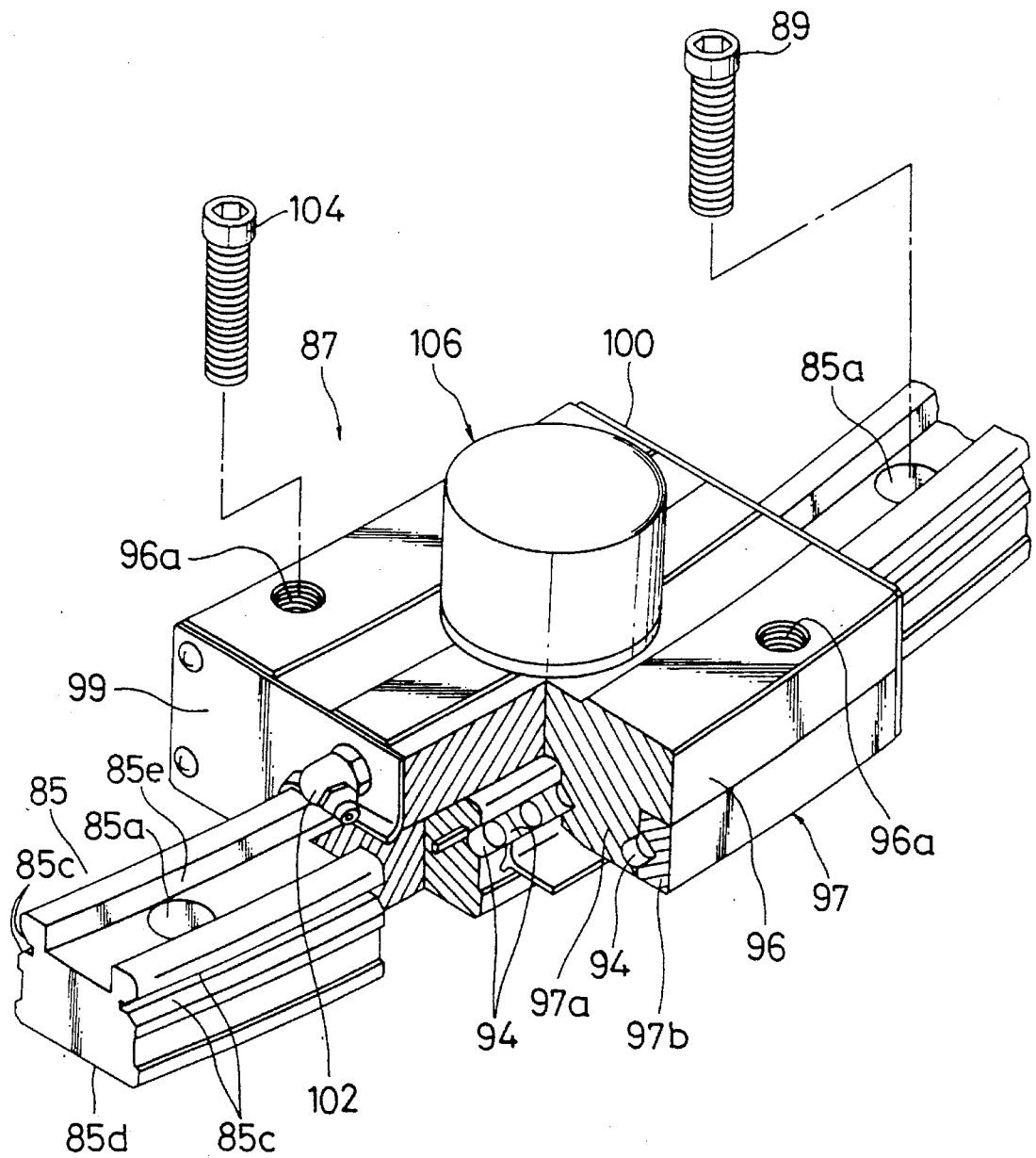
FIG. 15 is a perspective view, including a partial cross-section, of the essential portion of a rolling guide unit as a seventh embodiment of the present invention.

As shown in the drawings, slide unit 87 has a holding portion 96 in the shape of a flat plate, a pair of wings 97 coupled by screws and so forth to the left and right lower surfaces of said holding portion 96, and two seals 99 and 100 attached to each outer surface of said holding portion 96 and each wing 97. The above-mentioned rolling element circulating path 91 is composed of load bearing track grooves 91a and return paths 91b formed mutually in parallel in both wings 97 so as to respectively match the curvature of track rail 85, and a pair of roughly semi-circular return paths 91c and 91d, also formed in said wings 97, that connect said load bearing track grooves and return paths at both their ends. Furthermore, load bearing track grooves 91a correspond with track grooves 85c of track rail 85. In addition, grease nipple 102 is attached to slide unit 87 for supplying grease to the surface of the above-mentioned rollers 94. In addition, as shown in FIGS. 15 and 16, a large number of threaded holes 96a are formed in the upper surface, namely the holding surface, of slide unit 87. A table not shown is fastened to said slide unit 87 by bolts (with hexagon sockets) 104 screwed into these threaded holes 96a.

As is clear from FIG. 17, the shape of the cross-section of the above-mentioned load bearing track 91a is roughly that of the letter "V", opened towards the inside at an opening angle of 90°. On the other hand, the shape of the cross-section of return path 91b is roughly that of a square.

As shown in FIGS. 15 and 17, each of wings 97 of slide unit 87 is respectively composed of two blocks 97a and 97b adhered to the lower side of holding portion 96. However, block 97a is formed integrated into a single unit with holding portion 96 in this case. Grooves having a roughly V-shaped cross-section are each formed in advance in the outside of one block 97a and the inside of the other block 97b. The above-mentioned return paths 91b are formed by mutually joining each block 97a and 97b so that these corresponding V-shaped grooves are mutually opposed. In addition, the above-mentioned load bearing track grooves 91a are each formed on the inside of block 97a.

As described above, in the rolling guide unit as well, since rollers 94 are employed as rolling elements which bear the load by line contact, in comparison with rolling guide units of the prior art wherein balls that make point contact are employed, both load capacity and rigidity are increased, thus enabling the rolling guide unit to withstand large loads. Moreover, together with achieving improved vibration damping characteristics, low noise levels and smooth operation, a longer service life is attained. In addition, since a cross roller system is employed wherein each roller 94 is arranged so that the corresponding axes of rotation of adjacent rollers 94 cross, the rolling guide unit is able to adequately withstand the relatively large centrifugal force generated due to said rolling guide unit being of the curved type.

However, as shown in the drawings, a driving force generating device in the form of motor 106 is mounted in the center of the upper surface of slide unit 87. As is clear from FIG. 17, this motor 106 is mounted so that is output shaft 106a is perpendicular to mounting surface 85d of track rail 85, and in this case facing downward.

As shown in FIG. 17, output shaft 106a of motor 106 protrudes from the lower side of said slide unit 87 through through hole 87a formed in slide unit 87. Cylindrical drive roller 108 is fit onto this protruding portion.

On the other hand, as shown in FIGS. 15 and 16, track surface 85e is formed in the upper portion of track rail 85 to enable the above-mentioned drive roller 108 to engage and roll in parallel with track groove 85c equipped on said track rail 85. More specifically, a single groove having a rectangular cross-section is formed in the upper portion, namely the apex, of track rail 85, and one of the inside surfaces of this groove serves as this track surface 85e. As a result of employing a construction wherein drive roller 108 rolls using the inside surface of a groove for its track surface 85e in this manner, drive roller 108 does not make contact with countersunk portions 85a formed in track rail 85 for insertion of bolts, thus resulting in the obtaining of a smooth rolling state free of obstruction.

A prescribed amount of oil is continuously supplied to the above-mentioned track surface 85e. Accordingly, an oil film (not shown) is formed between drive roller 108 and said track surface 85e. Consequently, slide unit 87 is propelled by the resistance force, namely traction, that results during shearing of this oil film by the rotation of drive roller 108.

In the rolling guide unit of the above-mentioned constitution, when motor 106 is operated, drive roller 108 rolls over track surface 85e. Accordingly, slide unit 87 moves back and forth.

Figure 19:
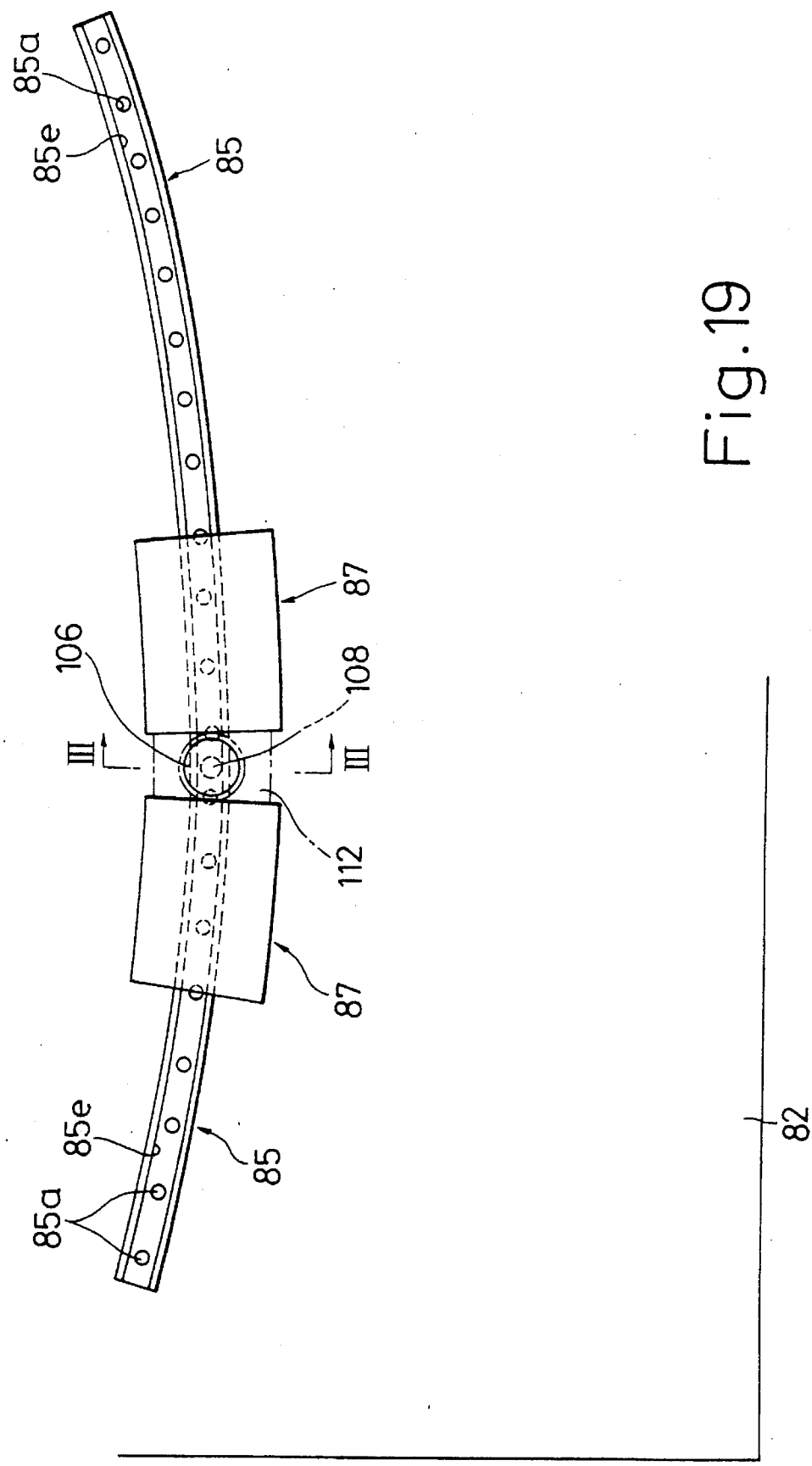
FIG. 19 is an overhead view of a rolling guide unit as an eighth embodiment of the present invention.
Figure 20:
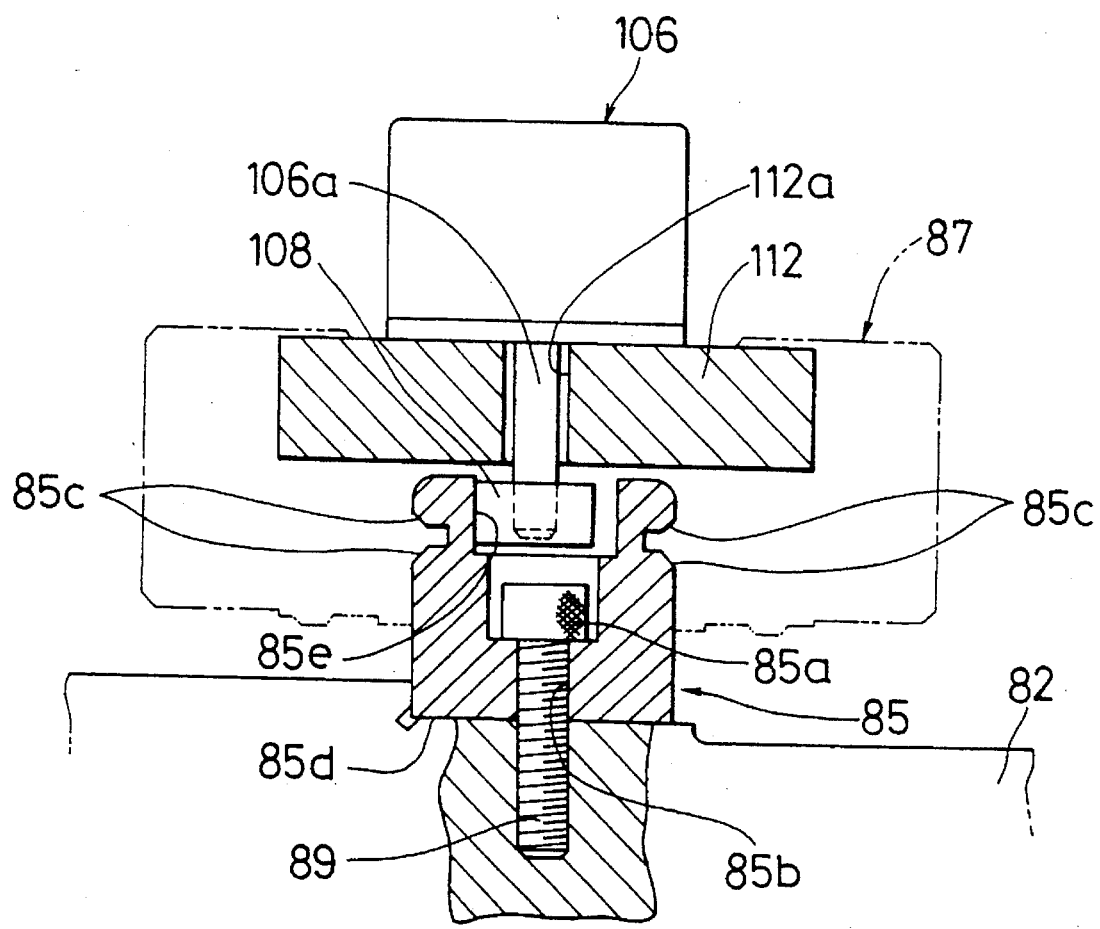
FIG. 20 is a view taken along arrows III—III relating to FIG. 19.

FIGS. 19 and 20 indicate the essential portion of a rolling guide unit as an eighth embodiment of the present invention. Furthermore, since the Polling guide unit of this eighth embodiment has a basic construction similar to the rolling guide unit shown as the seventh embodiment in FIGS. 15 through 18 with the exception of those portions explained below, an explanation of the overall unit is omitted. In addition, in the explanation below, the same reference numerals are used for those constituent members that are identical to or correspond with the constituent members of the rolling guide unit of the seventh embodiment. Moreover, this applies similarly in the explanation of the ninth embodiment provided later.

As shown in FIGS. 19 and 20, in the rolling guide unit, a plurality of, in this case two, sliders in the form of slide units 87, arranged in a row on track rail 85, are coupled into a single unit by coupling member 112 roughly in the shape of a flat plate. Motor 106 is mounted on the upper surface of this coupling member 112, and output shaft 106a of said motor 106 is inserted into through hole 112a formed in said coupling member 112.

Figure 21:
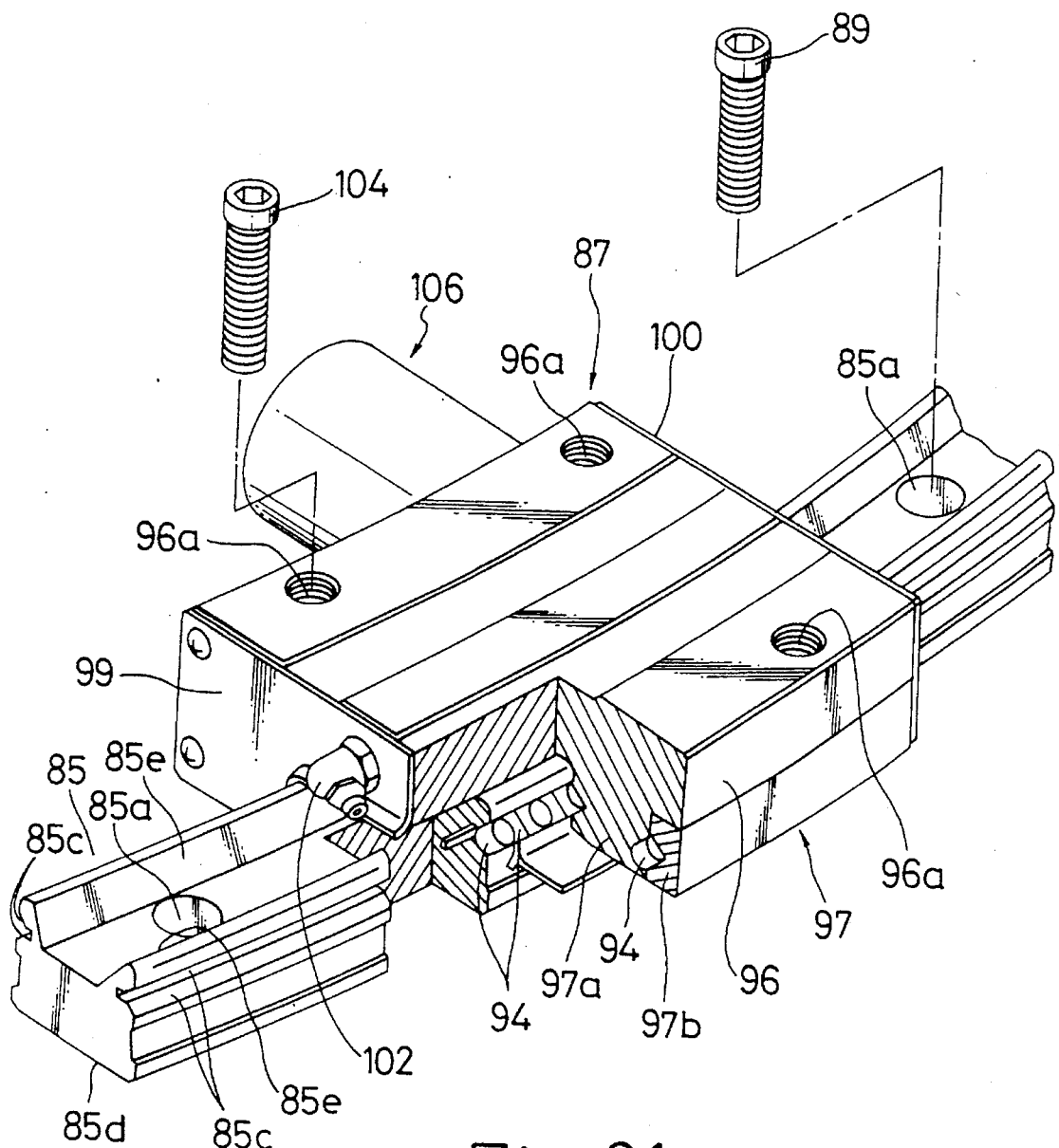
FIG. 21 is a perspective view, including a partial cross-section, of the essential portion of a rolling guide unit as a ninth embodiment of the present invention.
Figure 22:
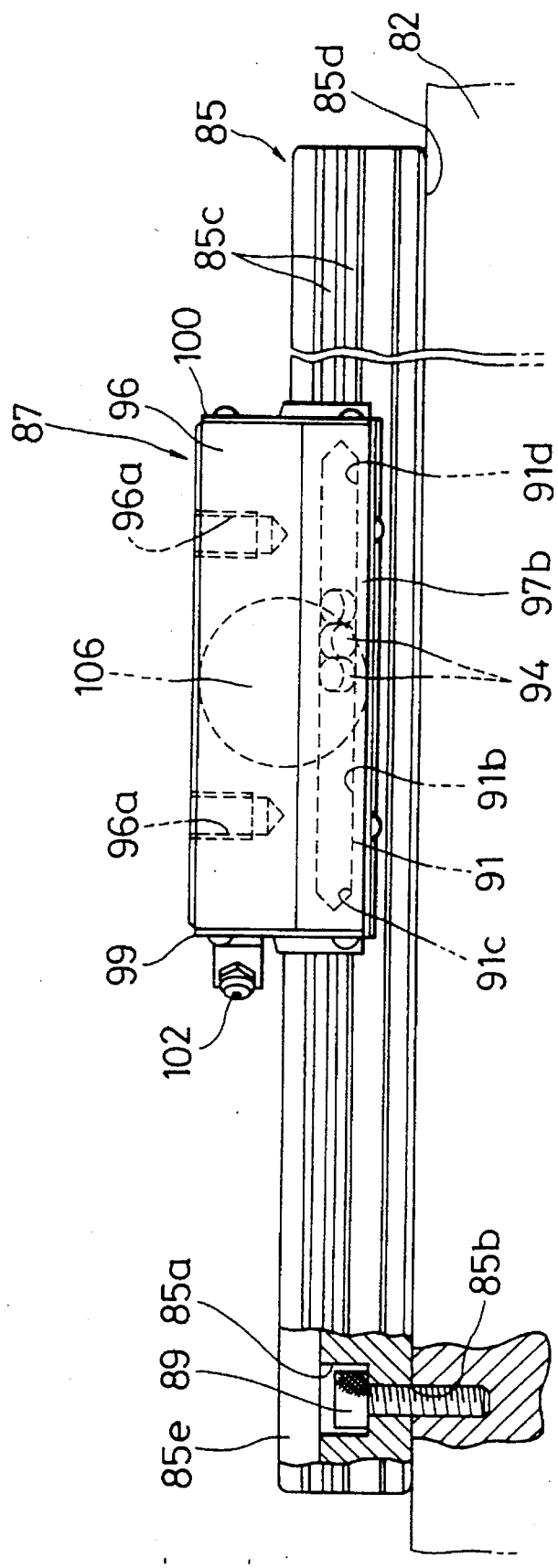
FIG. 22 is a side view, including a partial cross-section, of the essential portion of the rolling guide unit shown in FIG. 21.
Figure 23:
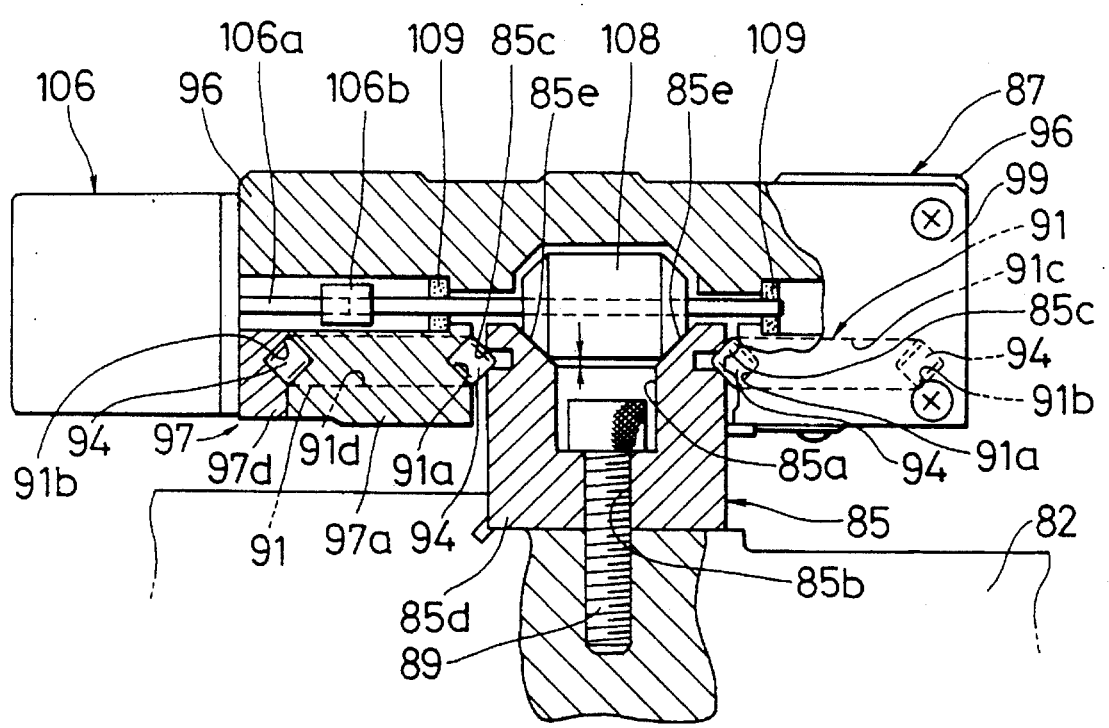
FIG. 23 is a front view, including a partial cross-section, of the rolling guide unit shown in FIGS. 21 and 22.

The essential portion of a rolling guide unit as a ninth embodiment of the present invention is shown in FIGS. 21 through 23.

As shown in the drawings, in this rolling guide unit as a ninth embodiment, a driving force generating device in the form of motor 106 is mounted in the center of the side of slide unit 87. More specifically, this motor 106 is mounted so that is output shaft 106a is perpendicular to track rail 85, and parallel to mounting surface 85d of track rail 85. As a result of mounting motor 106 in this manner, motor 106 is contained within the range of the height of slide unit 87, thus enabling the dimension of height of the overall unit to be minimized. In addition, when a table (not shown) is installed on slide unit 87, motor 106 does not obstruct the table.

As shown in FIG. 23, output shaft 106a of motor 106 protrudes into the space inside slide unit 87 through a through hole formed in said slide unit 87. Cylindrical drive roller 108 is fit onto this protruding portion. The above-mentioned output shaft 106a is supported by slide unit 87 by means of two bearings 109 composed of ball bearings or oil-less bearings and so forth. In addition, output shaft 106a is separated near its midpoint, and both separated portions are coupled by coupling 106b. As a result of employing this construction, together with centering being able to be performed easily, removal of motor 106 is simplified.

On the other hand, as shown in FIGS. 21 and 22, two flat track surfaces 85e are formed in the upper portion of track rail 85 to enable the above-mentioned drive roller 108 to engage and roll in parallel with track groove 85c equipped on said track rail 85. More specifically, a single groove having a roughly trapezoidal cross-section is formed in the upper portion of track rail 85, and the left and right slopes of this groove serve as these track surface 85e. As a result of employing a construction wherein drive roller 108 rolls using the slopes of a groove for its track surfaces 85e in this manner, drive roller 108 does not make contact with countersunk portions 85a formed in track rail 85 for insertion of bolts, thus resulting in the obtaining of a smooth rolling state free of obstruction.

A prescribed amount of oil is continuously supplied to the above-mentioned track surfaces 85e. Accordingly, an oil film (not shown) is formed between drive roller 108 and said track surfaces 85e. Consequently, slide unit 87 is propelled by the resistance force, namely traction, that results during shearing of this oil film by the rotation of drive roller 108.

Figure 24:
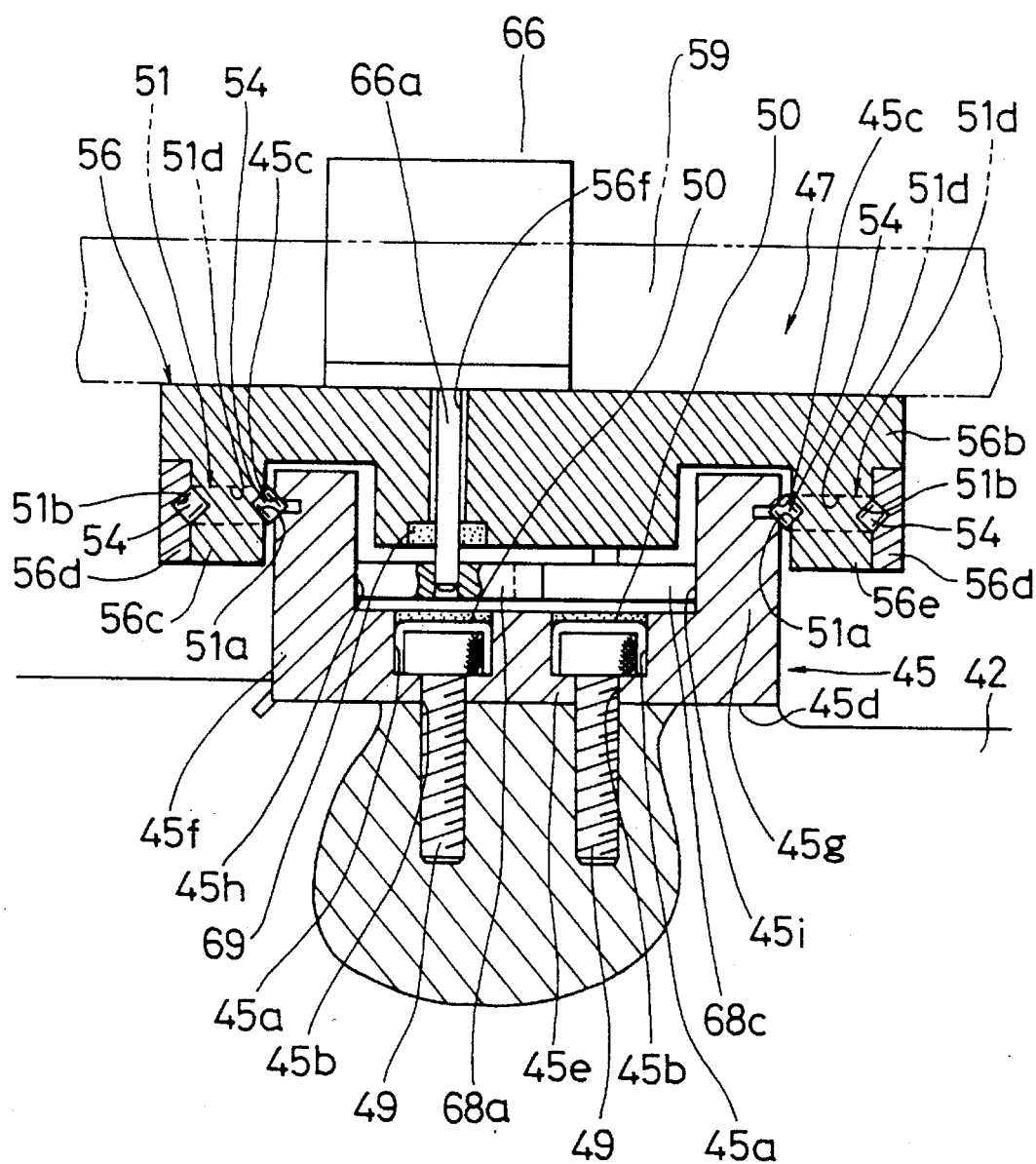
FIG. 24 is a front view, including a partial cross-section, of a rolling guide unit as a tenth embodiment of the present invention.

FIG. 24 indicates the essential portion of a rolling drive unit as a tenth embodiment of the present invention. Furthermore, since the rolling guide unit of this tenth embodiment is composed similar to the rolling guide unit shown as a sixth embodiment in FIGS. 12 through 14 with the exception of those portions explained below, an explanation of the overall unit is omitted. In addition, in the explanation below, the same reference numerals are used for those constituent members that are identical to or correspond with the constituent members of the rolling guide unit of the sixth embodiment.

As shown in the drawing, in the rolling guide unit, track rail 45 does not have flanges. Accordingly, bolts 49 for securing track rail 45 to bed 42 are arranged in the bottom of track rail 45 formed so that its cross-section is roughly in the shape of the letter "U" to provide track surfaces 45*h* and 45*i*. Track groove 45*c* is formed in the outside of track rail 45. On the other hand, slide unit 47 straddles this track rail 45, and load bearing track grooves 51*a* are formed in its inside surfaces. Furthermore, as shown in the drawing, caps 50 are tightly inserted into countersunk portions 45*a* formed in the bottom of track rail 45 for insertion of bolt heads. However, these caps 50 are not required to be provided.

Furthermore, in each of the above-mentioned embodiments, although a track rail is formed having an equal curvature over its entire length, the track rail is not limited to a simple arc shape, but can be freely set as desired, such as by combining a plurality of curve segments into an S-shaped curve, free curve and so forth.

In addition, the present invention is not limited to the first through tenth embodiments described above, but rather can realize a diverse range of arrangements by mutually combining and applying even a portion of each of these embodiments.

Moreover, although a construction is indicated in each of the above-mentioned embodiments wherein each of the axes of a load bearing track groove and return path in which rollers circulate is on the same horizontal plane, a construction wherein both axes are not set on the same horizontal plane is disclosed, for example, in Japanese Examined Patent Publication No. 4-8647, and this can naturally also be applied to the present invention.

As has been explained above, in the rolling guide unit according to the present invention, since rollers that bear a load by line contact are employed as rolling elements, in comparison with rolling guide units of the prior art using balls that make point contact, the present invention offers the advantages of increased load capacity and rigidity to enable the rolling guide unit to withstand larger loads, attainment of improved vibration damping characteristics, low noise levels and smooth operation, and achievement of a longer service life. In addition, since a cross roller system is employed for each of the rollers wherein the rollers are arranged so that the axes of rotation of adjacent rollers cross, the rolling guide unit is able to adequately withstand the relatively large centrifugal force generated in curved type rolling guide units.

What is claimed is:

1. A rolling guide unit comprising: a track rail having side walls in which is formed track grooves having a roughly V-shaped cross-section along a lengthwise direction thereof; a slider, in which is formed a rolling element circulating path containing load bearing track grooves having a roughly V-shaped cross-section and corresponding to said track grooves, said slider being able to freely perform relative motion with respect to said track rail; a rail insert arranged along the inside surface of one of said side walls, a track groove having a roughly V-shaped cross-section being formed along a lengthwise direction in an inside surface of Said rail insert; and, a plurality of rollers arranged and contained within said rolling element circulating path such that axes of rotation of adjacent rollers lie in planes that cross, said rollers circulating while rolling along said track grooves;

said rolling guide unit having a prescribed curvature in the direction of said relative motion.

2. The rolling guide unit as set forth in claim 1 wherein said track grooves are formed on outer sides of said track rail, said track rail having a roughly rectangular cross-section perpendicular to its lengthwise direction, said slider being arranged to straddle said track rail and having portions extending over said outer sides, said load bearing track grooves being formed in inside surfaces of said portions.

3. The rolling guide unit as set forth in claim 1 wherein said track rail is equipped with side walls extending roughly perpendicular to a bottom surface a mounting surface being formed on said bottom surface, and said track grooves being formed in at least one of said side walls, said slider being inserted between said side walls.

4. A rolling guide unit as recited in claim 1, wherein countersunk portions are formed in said track rail to receive heads of mounting bolts to allow the heads to be flush with a surface of said track rail when said track rail is mounted to a bed by the bolts.

5. The rolling guide unit as set forth in claim 1, wherein said rail insert is movable toward and away from said one side wall, and includes a pressure adjustment device which move said rail to adjust the tolerance between said track grooves as well as between load bearing track grooves and rollers.

6. The rolling guide unit as set forth in claim 1, further including a driving force generating device and a driven rotatable member mounted on said slider, said rotatable member receiving a driving force from said driving force generating device.

7. The rolling guide unit as set forth in claim 6 wherein a rack is formed along the lengthwise direction of said track rail, and said rotatable member is a pinion that meshes with said rack.

8. The rolling guide unit as set forth in claim 6 wherein an oil film is formed between said track rail and said rotatable member.

9. The rolling guide unit as set forth in claim 6 wherein said rotatable member is in contact with said track rail.

10. The rolling guide unit as set forth in claim 9 wherein knurlings are formed on an aligning surface of at least one of said track rail and said rotatable member.

11. The rolling guide unit as set forth in claim 9 wherein an elastic member having a high coefficient of friction is adhered to an aligning surface of at least one of said track rail said rotatable member.

12. A rolling guide unit comprising:

a curved track rail having track grooves formed therein, said track grooves having a substantially v-shaped cross section as viewed in a lengthwise direction of said track rail;

a slider having a rolling element circulating path formed therein, said slider having load bearing track grooves formed therein which constitute a portion of the rolling element circulating path and which have a substantially v-shaped cross section as viewed in a lengthwise direction of said slider, said load bearing track grooves corresponding to said track grooves, said slider being freely slidable with respect to said track rail to roll along a curved path defined by said track rail;

a plurality of rollers contained within said rolling element circulating path and being disposed so that axes of rotation of adjacent rollers lie in planes that cross one another, said rollers circulating while rolling along said rolling element circulating path; and wherein said track rail comprises a rail insert disposed along a surface of a side wall of said track rail, one of said track grooves being formed in said rail insert, said rail insert being mounted to said surface by a pressure adjusting device which allows said rail insert to move toward and away from said surface whereby a tolerance between said track grooves, said load bearing track grooves, and said rollers is adjusted.

* * * * *